United States Patent [19]

Hida et al.

[11] Patent Number: 5,367,547
[45] Date of Patent: Nov. 22, 1994

[54] FUEL ASSEMBLY FOR BOILING WATER REACTOR AND CORE

[75] Inventors: Kazuki Hida; Yasushi Hirano, both of Kawasaki; Koji Hirukawa; Tsuyoshi Nakajima, both of Yokohama, all of Japan

[73] Assignee: Kabushiki Kaisha Toshiba, Kawasaki, Japan

[21] Appl. No.: 79,527

[22] Filed: Jun. 22, 1993

[30] Foreign Application Priority Data

Jun. 22, 1992 [JP] Japan .................. 4-162856
Oct. 7, 1992 [JP] Japan .................. 4-268769

[51] Int. Cl.$^5$ .............................. G21C 3/32
[52] U.S. Cl. .................. 376/435; 376/428; 376/419
[58] Field of Search .......... 376/428, 435, 418, 419; 976/DIG. 116

[56] References Cited

U.S. PATENT DOCUMENTS

| | | | |
|---|---|---|---|
| H 722 | 1/1990 | Sofer et al. | 376/428 |
| 4,629,599 | 12/1986 | Crowther et al. | 376/212 |
| 4,968,479 | 11/1990 | Ogiya et al. | 376/428 |
| 5,202,085 | 4/1993 | Aoyama et al. | 376/435 |
| 5,219,519 | 6/1993 | Matzner | 376/412 |

FOREIGN PATENT DOCUMENTS 4-58191 2/1992 Japan .

*Primary Examiner*—Donald P. Walsh
*Assistant Examiner*—Meena Chelliah
*Attorney, Agent, or Firm*—Foley & Lardner

[57] ABSTRACT

A fuel assembly for a boiling water reactor comprising an upper and lower tie plates, a plurality of fuel rods filled therein with a plurality of fuel pellets, a fuel bundle comprising the fuel rods retained with a plurality of spacers in spaced relation and disposed between the upper and lower tie plates, and a polygonal tube-like channel box which encloses the fuel bundle and constitutes flow paths for coolant. The fuel rods comprise long fuel rods and short fuel rods which are each shorter in the effective portion than each of the long fuel rods. The concentration of fissile material in each of the short fuel rods is lower than the mean concentration of fissile material in the cross section of the fuel bundle. In the case the fuel bundle is vertically subdivided into two regions, an upper and lower one, with the upper end of the effective portion of each of the short fuel rods as a border, the mean concentration of fissile material in the cross section of the fuel bundle in the region lower than the border is lower than that in the cross section of the fuel bundle in the region above the border.

17 Claims, 22 Drawing Sheets

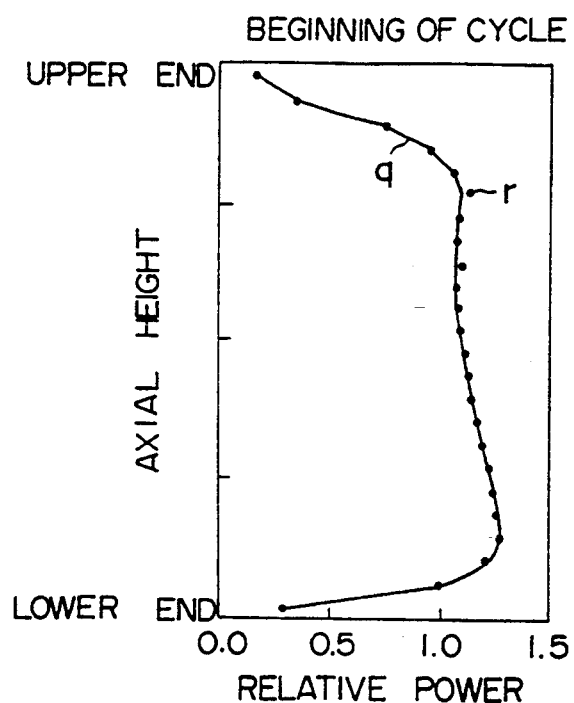
F I G. 2 (A)
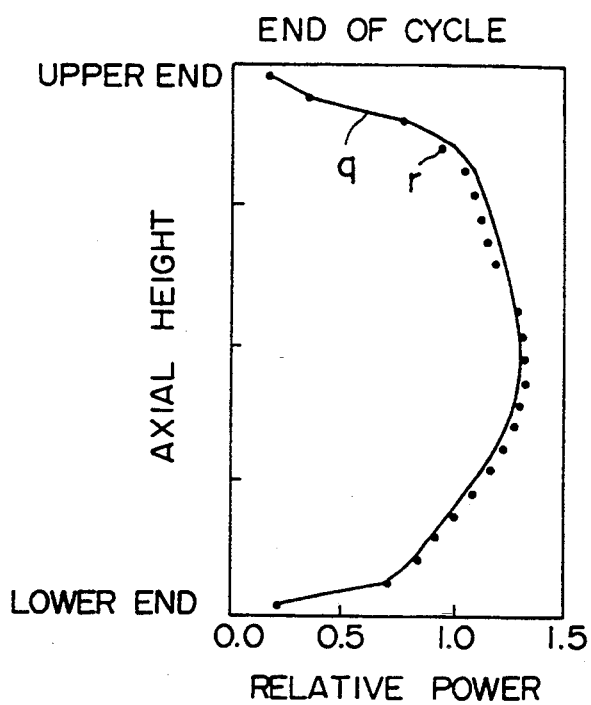
F I G. 2(B)

ENRICHMENT $p > q > r > s$
$t = 4.10\%$

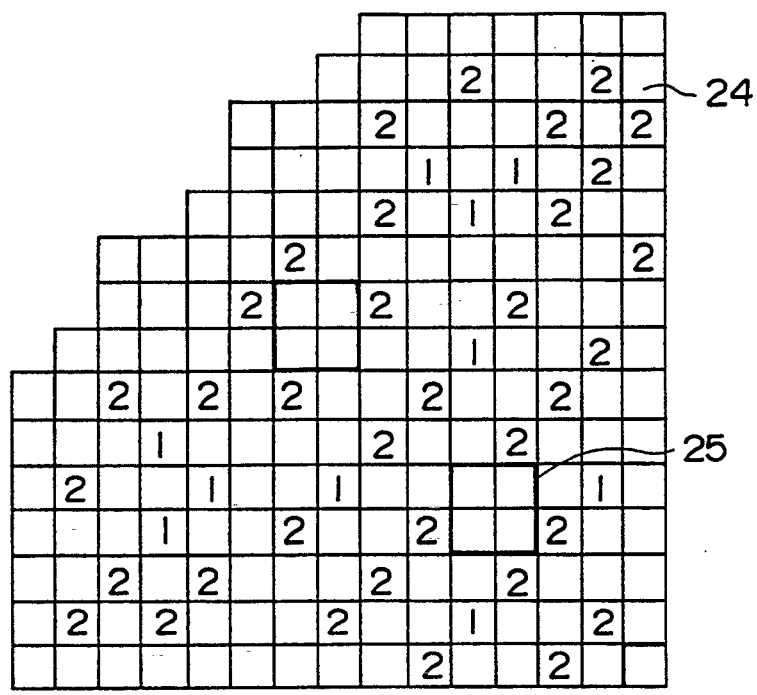
F I G. 10 (A)
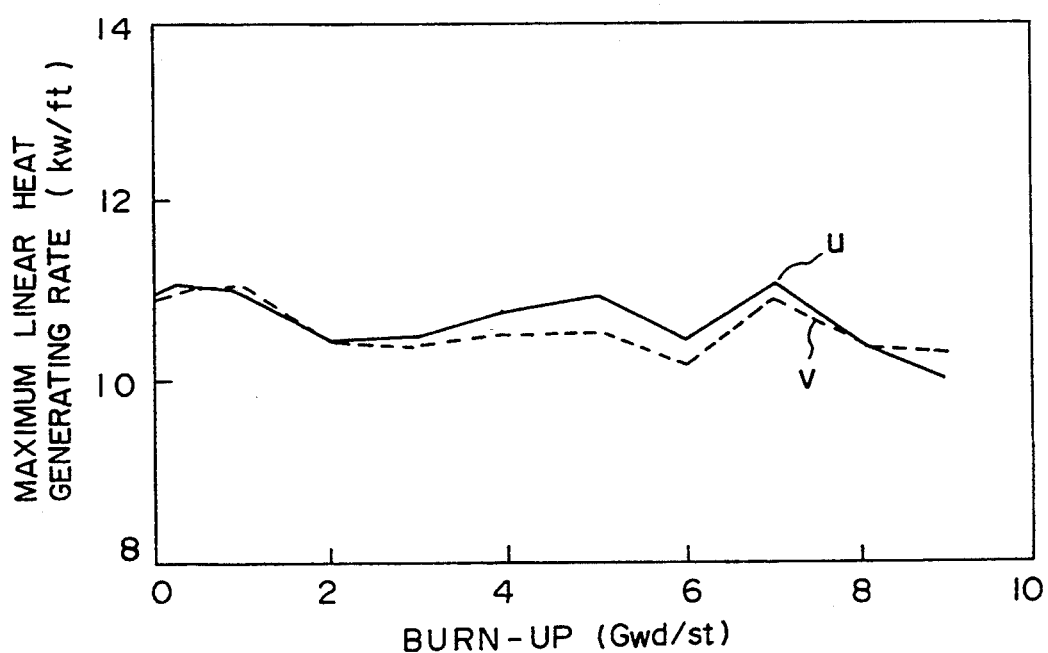
F I G. 10 (B)

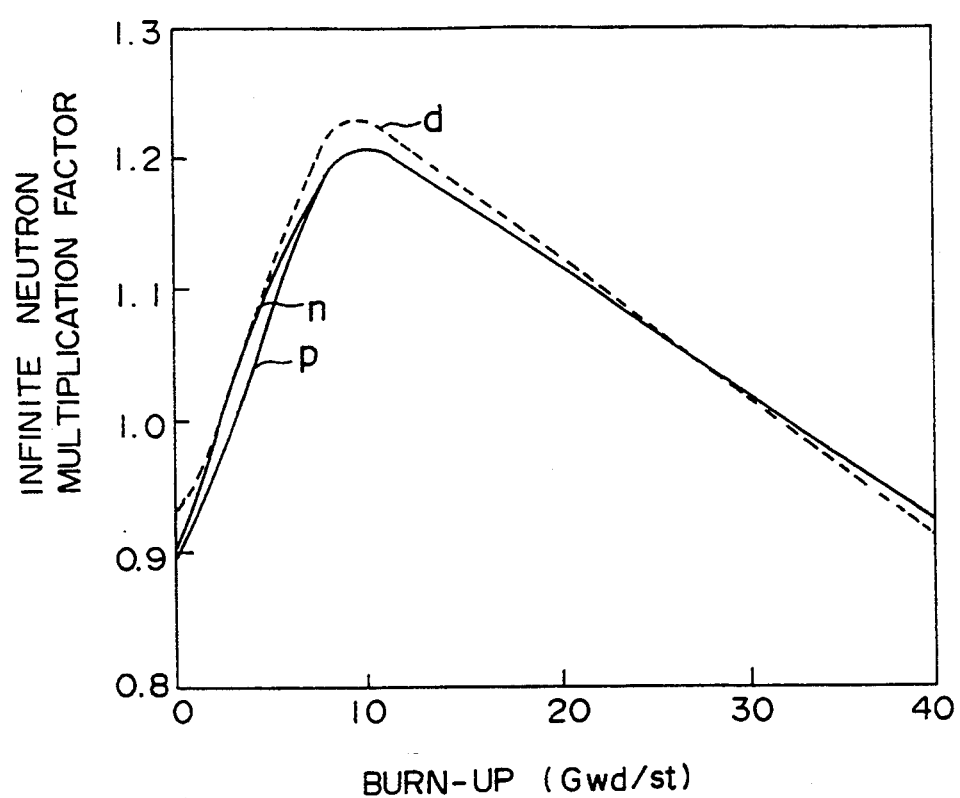
F I G. 20

FUEL ASSEMBLY FOR BOILING WATER REACTOR AND CORE

FIELD OF THE INVENTION

This invention relates to a fuel assembly for a boiling water reactor and a core, and more particularly to a fuel assembly for high burn-up having improved thermal margin and economy and a core for a boiling water reactor in which the fuel assemblies for high burn-up are loaded.

BACKGROUND OF THE INVENTION

The high burn-up of fuel has recently been developed for improving the economy of nuclear power generation. An example of such a fuel assembly for high burn-up will be described with reference to FIG. 16. FIG. 16(A) is an elevation view showing a fuel assembly with parts partially sectioned; FIG. 16(B) is a sectional view taken along line B—B of FIG. 16(A); and FIG. 16(C) is a sectional view taken along line C—C of FIG. 16(A).

Referring to FIG. 16(A), the fuel assembly 1 comprises long fuel rods 2, short fuel rods 3 and large water rods 6, all of which are bundled in the form of a square lattice with spacers 8 and secured to an upper tie plate 4 and a lower tie plate 5 to form a bundle of fuel rods, which is in turn enclosed by a channel box 7. Furthermore, outer springs 9 are interposed between the long fuel rods 2 and the upper tie plates 4.

** 1 The construction of the long fuel rods 2 and the short fuel rods 3 will be described with reference to FIG. 17. Each of the long and short fuel rods 2 and 3 constituted by partially filling a cylindrical cladding tube 11 with a plurality of fuel pellets 10 and then sealing the upper and lower ends of the cladding tube 11 with an upper end plug 12 and a lower end plug 13. The upper portion above the active portion filled with the fuel pellets 10 is provided with a space of an approximately 40 cm length called gas plenum 14 to reduce a rise in the inner pressure due to nuclear fission product gas.

** 2 A spring 15 is inserted in the gas plenum 14 to fix the fuel pellets during transport of the fuel assembly. Each long fuel rod 2 is filled with the fuel pellets to the lower end portion, however each short fuel rod 3 is provided with another gas plenum 14 also at the lower portion and the position of the fuel pellets is fixed with a support member (not shown).

** 3 In each of the usual fuel rods, since the gas plenum 14 is positioned in the portion above the active portion, it does not affect the core characteristic such as thermal margin, shut down margin and the like. However, in the case where the short fuel rod is provided with the gas plenum above the active portion, the gas plenum is located in a position corresponding to the active portion of the long fuel rod, and therefore, the influence on the core characteristic can not be ignored.

** 4 Since use of the short fuel rods 3 originally reduces the fuel inventory per fuel assembly, the cost of the fuel cycle is increased and economy becomes worse. Moreover, since each short fuel rod has less coolant in the axial position of the gas plenum than at the upper portion thereof, the shut down margin becomes worse. In the example shown in FIG. 17, such a worsening of the shut down margin is minimized by partially distributing the gas plenum 14 to the lower end portion of the short fuel rod.

** 5 Consequently, in order to extend the active fuel length for improving fuel economy, the gas plenum 14 must be shortened, because the entire length of each short fuel rod 3 can not be made longer from the viewpoint of a change for the worse in the stability due to an increase in pressure loss, and the maintenance of the relation of positions between the upper ends of the short fuel rods 3 and the spacers 8. In addition, the gas plenum 14 is preferably as short as possible for enhancement of the shut down margin. However, the gas plenum 14 can not be easily shortened due to the primary object of the gas plenum which is to reduce the rise in inner pressure due to nuclear fission product gas.

The fuel assembly for high burn-up as constituted above has the following features as compared with the fuel assembly for low burn-up in the prior art disclosed in JPA 296192 (1990).

That is, a high enrichment of fuel is necessary to achieve the high burn-up, however the peaking of axial power which results from the void distribution is increased more than ever thereby. In addition, since more various histories of fuels exist together with different periods of staying in the core, an increase in the peaking of radial power is also brought about.

As a result, the thermal margins of the maximum linear heat generation rate, the minimum critical power ratio and the like are reduced. In order to improve such disadvantages, the number of the fuel rods in the fuel assembly 1 shown in FIG. 16 is increased by changing the arrangement of the fuel rods of 8 rows and 8 columns to that of 9 rows and 9 columns.

However, such an increase in the number of the fuel rods causes an increase in pressure loss, thereby impairing the stability of the nuclear reactor. For this reason, in the fuel assembly 1 shown in FIG. 16, a part of the long fuel rods are made shorter in length into the short fuel rods 3 which are used to thereby enlarge the upper flow path for fuel which is greater in pressure loss because of the two-phase flows of coolant, thereby canceling the increase in pressure loss due to the increase in the number of the fuel rods. The length of each short fuel rod 3 amounts to approximately $\frac{2}{3}$ that of each long fuel rod 2, as apparent from FIGS. 17(A) and (B).

In the meantime, if the power becomes excessive, heat transfer from the fuel rods to the coolant changes from efficient nucleate boiling to inefficient film boiling, and the power of the fuel assembly, when such a boiling transition occurs, is a critical power.

There is a high possibility that the boiling transition occurs at the upper portions of the fuel rods. Each short fuel rod 3 is positioned at the place where the cooling efficiency of the fuel rods is lower, thereby causing an increase in the minimum critical power ratio.

Each short fuel rod 3 further has a function of enhance the shut down margin. When the reactor is shut down, the neutron flux forms a peak in a position $\frac{1}{4}$ to $\frac{1}{3}$ down the entire length of the core from its upper end.

When the reactor is shut down, the coolant functions as a neutron absorber because of a lower temperature and higher density, and therefore, the reduction of the number of the fuel rods and the increase in the amount of the coolant in the axial upper portion thereof enables the shut down margin to be enhanced.

In the fuel assembly 1 composed of the long fuel rods 2 and the short fuel rods 3, as described above, since the number of the fuel rods is different in the axial upper region where the short fuel rods 3 do not exist (the section taken along line B—B of FIG. 16(B)) and the axial lower region where the short fuel rods 3 exist (the section taken along line C—C of FIG. 16(C)), the characteristic of the reactivity during the operation is greatly different at the upper and lower parts of the fuel assembly.

The high-energy neutron produced by nuclear fission is easily slow down at the upper part where the ratio of moderator to fuel is large, and therefore, the infinite neutron multiplication factor at the upper part is larger than that at the lower part.

While the boiling water reactor originally easily produces a power peak at the lower part during the power operation because of void distribution, in the core loaded with the fuel assembly 1 including the short fuel rods 3, the difference in the ratio of moderator to fuel between the upper and lower parts due to the difference in the number of the fuel rods reduce the power peak, thereby providing the preferable effect of the axial power distribution being flattened for a long period of burn-up.

However, at the beginning of the fuel lifetime, there is a problem that the difference in the number of the fuel rods at the upper and lower parts increases the power peaking occurring at the lower part. In the fuel assemblies used for a boiling water reactor, any burnable poisonous matter such as gadolinia is generally mixed in a part of the fuel rods for control of the reactivity.

This lowers the infinite neutron multiplication factor at the beginning of burn-up to thereby flatten the change of the excess reactivity in the core and enhance the operating and safe performance of the reactor. The amount of control of the reactivity at the beginning of burn-up due to gadolinia is substantially proportional to the number of the fuel rods containing gadolinia, and the period when the control of the reactivity is continued is substantially proportional to the concentration of gadolinia.

However, in the fuel assembly 1 including the short fuel rods 3 as shown in FIG. 16, even if the number of the fuel rods containing gadolinia is equal in the upper and lower parts thereof, there is a difference in the poisonous effect of gadolinium due to the difference in the ratio of moderator to fuel, and consequently, the amount of control of the reactivity at the beginning of burn-up is larger in the upper part, where the number of the fuel rods per section of the fuel assembly is less and the amount of moderator is more, than in the lower part.

As a result, particularly at the beginning of the operating cycle of the reactor, the infinite neutron multiplication factor in the upper part becomes smaller than that in the lower part and the peaking of power in the lower part of the core increases.

As an example, the infinite neutron multiplication factors, at the time the void fraction is 40%, of the fuel assembly 1 shown in FIG. 16, in the case where the average enrichment of fuel assembly is approximately 4% and gadolinia is not contained, are shown with curves "a" and "b" in FIG. 18. Curves "a" and "b" show the infinite neutron multiplication factors at the lower part and the upper part, respectively.

Further, since the void fraction in the core is smaller than 40% at the lower part and larger than 40% at the upper part, the comparison of the infinite neutron multiplication factors in the void fraction at each of the upper and lower parts is more precise. However, since the relation of the relative difference of the infinite multiplication factors between the upper and lower parts is important here, a comparison is made with the same void fraction.

As shown in FIG. 18, the infinite neutron multiplication factors are larger at the upper part (curve b) than at the lower part (curve a), and the difference therebetween is at a maximum at the beginning of the burn-up and reduces along with the increase of the burn-up. In general, the axial power distribution of the boiling water reactor has a lowermost peak at the beginning of the operating cycle and gradually shifts upwards to the end of the operating cycle, since the burn-up at the lower part proceeds earlier than at the upper part during burn-up.

The difference between the infinite neutron multiplication factors at the upper and lower parts shown with curves a and b in FIG. 18, is preferable to rectify the change in the power distribution for the burn-up as described above and to provide a flat axial power distribution throughout the operating cycle.

On the contrary, the change in the infinite neutron multification factors for burn-up in the case where gadolinia of a concentration of 3.5% is added to 14 long fuel rods 2 over the entire length is shown with curves c and d in FIG. 18. Curves c and d show the infinite multiplication factors at the lower and upper parts, respectively.

Since the capability to control the reactivity due to gadolinia is larger at the upper part than at the lower part, the infinite neutron multiplication factors at the upper and lower parts are reversed at the beginning of burn-up, and an increase in the downward peak at the beginning of the operating cycle is caused.

For the characteristics of the cores loaded with such fuel assemblies, (A) axial (and radial) power peaking, (B) maximum linear heat generating rate, and respective axial power distributions (C) at the beginning of the operating cycle and (D) at the end of the operating cycle are shown in FIG. 19 concerning a core loaded with a first fuel assembly composed of 66 long fuel rods 2 and 8 short fuel rods 3, and a core loaded with a second fuel assembly composed only of 74 long fuel rods 2.

In any fuel assembly, all the long fuel rods 2 are provided with regions of natural uranium at the upper and lower ends thereof, and gadolinia with a concentration of 3.5% is added to 14 long fuel rods 2 among them in their inner regions except the regions of natural uranium.

In FIG. 19, the respective axial power peakings of the first and second fuel assemblies are shown with curves e and f, the respective maximum linear heat generating rate with curves g and h, and the respective axial power distributions with curves i and k and with curves j and l.

The core loaded with the first fuel assemblies, the axial power distribution of which becomes a downward peak from the beginning to the middle of the operating cycle, has an increased axial power peaking as compared with the core loaded with the second fuel assemblies, and the maximum linear heat generating rate increases at the beginning of the operating cycle by the maximum 0.6 kw/ft. At the end of the operating cycle, the differences in the axial power distributions and also in the maximum linear heat generating rate between the first and second fuel assemblies, are small.

Hereupon, the features of the axial power distribution described above, have the effect of improving fuel economy, which is described, for example, in JPA- 296192(1990). That is, the operation with a downward peak of axial power distribution from the beginning to the middle of the operating cycle increases the average void fraction of the core, and particularly, hardens neutron energy spectrum in the upper part of the core.

As a result, the production of plutonium is promoted, and the axial power distribution becomes an upward peak at the end of the operating cycle, causing the plutonium accumulated in the upper part to be burned up effectively. Such an effect is called as spectral shift effect.

In the characteristic of the infinite neuron multiplication factor in FIG. 18 in the fuel assembly 1 shown in FIG. 16, the difference in the infinite neutron multiplication factors between the upper and lower parts resulting from the difference in the number of the fuel rods rectifies the downward peak at the beginning of the operating cycle and flattens the axial power distribution, thereby reducing spectral shift effect.

In the manufacturing process of the fuel rods for the prior embodiment described above the fuel pellets are filled in the cladding tube one by one, however the more the kinds of the fuel pellet enrichments to be used to fill the tube are, the more complicated the manufacturing process becomes.

** 6 Besides, after the cladding tube is filled with the fuel pellets, a checking operation is made to see if they have filled the tube correctly; however, the more the kinds of the fuel pellet enrichment are, the more complicated the checking operation becomes. Consequently, according to the circumstances, such a checking operation has the possibility of increasing the manufacturing cost.

** 7 In addition, the critical power is increased by providing short fuel rods in place of the long fuel rods in the position where the cooling efficiency is worst; however, there is the possibility that a boiling transition occurs in the long fuel rods. In order to further improve upon such a disadvantage, making the enrichment at the upper portion of the long fuel rods lower is conceivable, however, this results in production of the distribution of the enrichment, which, in turn, brings about the complicated manufacturing process of the fuel rods, as described above.

On the other hand, for example, JPA-296192(1990) discloses the fact that two types of fuel assemblies, type 1 having more fuel rods containing gadolinia and type 2 having less fuel rods containing gadolinia, are previously provided and the ratio of the number of the type 1 and type 2 assemblies is varied as occasion demands, thereby coping with fluctuation in any period of the operating cycle, so-called the technique regarding a 2 type burnable poison design fuel assembly core (hereinafter referred to as 2 stream fuel assembly core).

That is, the fluctuation in length of the current or previous operating cycle often compels a change from the original plan in the number of assemblies where the fuels are to be replaced. In such a case, if the number of assemblies to be replaced decreases compared with the plan, more type 1 fuel assemblies are loaded, and if the number of assemblies to be replaced increases compared with the plan, more type 2 fuel assemblies are loaded. This allows the excess reactivity of the core at the beginning of the cycle to be set to a suitable range of 1–2% Δk.

Generally, in such a 2 stream fuel assembly core, type 1 fuel assemblies with a higher number of fuel rods containing gadolinia and a smaller infinite neutron multiplication factor are arranged in the center of the core, and type 2 fuel assemblies are arranged outside the center of the core.

Since the power distribution in the radial direction of the core is higher in the central portion and lower outside the central portion, the two types of fuel assemblies with a different number of fuel rods containing gadolinia are arranged as described above, so that the power distribution in the radial direction is flattened and the maximum linear heat generating rate and minimum critical power ratio are improved.

However, in such a core, there are some cases where the maximum linear heat generating rate appears in the fuel assemblies arranged outside the center of the core. In general, since higher burn-up results in higher enrichment, the infinite neutron multiplication factor after gadolinia burns out becomes larger and, on the other hand, the number of the fuel rods containing gadolinia per fuel assembly increases: accordingly, the infinite neutron multiplication factor at the beginning of burn-up decreases.

Therefore, at the beginning of the operating cycle, it is easy for the maximum linear heat generating rate to appear in the fuel in the second cycle after loading with the greatest infinite neutron multiplication factor. The concentration of gadolinia is set to burn out at the end of the once operating cycle; however, since the power is lower outside the center of the core than in the central portion and the speed of burn-up is slow, there is a possibility that the infinite neutron multiplication factor reaches a peak just in the fuel in the second cycle after loading arranged outside the center of the core.

Moreover, when the burn-up proceeds with a downward power peak, at the end of operating cycle the infinite multification factor at the upper part becomes larger than that at the lower part in the central portion, however the downward power peak remains unchanged since the burn-up is less outside the center of the core as compared with that at the center of the core. Accordingly, in the core with a 2-stream fuel assembly, different axial designs are required for each fuel assembly corresponding to the radial position where new fuel assemblies are loaded.

Further, in the case where a transition is made from an equilibrium core loaded only with fuel assemblies for lower burn-up having low enrichment to an equilibrium core loaded only with fuel assemblies for high burn-up having high enrichment, the fuel assemblies for low burn-up are removed and the fuel assemblies for high burn-up are loaded successively with every exchange of fuel.

In such a first or second transition cycle, since the fuel assemblies for high burn-up having high enrichment are loaded in the core in a smaller ratio than those for low burn-up having low enrichment, maximum radial power peakings occur in the fuel assemblies for high burn-up.

In addition, the higher the enrichment of fuel is, the more downward the peak of the axial power distribution thereof becomes. Therefore, there is the problem that in the transition cycle, it is easy for the maximum linear heat generating rate to increase as compared with that of the equilibrium core.

SUMMARY OF THE INVENTION

An object of the invention is to provide a fuel assembly for high burn-up with short fuel rods in which the thermal margin and shut down margin are improved to improve fuel economy, and which is simple in construction and easy to produce.

Another object of the invention is to provide a fuel assembly for high burn-up, which particularly suppresses an increase in the maximum linear heat generating rate at the beginning of the operating cycle and has a sufficient thermal margin in the fuel assembly with short fuel rods.

A further object of the invention is to provide a fuel assembly for high burn-up, which shows sufficient spectral shift effect and accomplishes considerable economy by utilizing the difference in the characteristics of the infinite neutron multiplication factor between upper and lower parts due to the number of the fuel rods difference and difference in the amount of gadolinia, since the mere flattening of the axial power distribution reduces the spectral shift effect.

Still a further object of the invention is to provide the core of a boiling water reactor, which reduces the maximum linear heat generating rate in the equilibrium cycle and the transition cycle, particularly at the beginning of the operating cycle, thereby providing a sufficient thermal margin in a 2-stream fuel assembly core.

In order to achieve the above-described object, according to the invention, there is provided a fuel assembly for a boiling water reactor, which comprises an upper tie plate; a lower tie plate; a plurality of fuel rods which are filled therein with a plurality of fuel pellets, said plurality of fuel rods comprising long fuel rods and short fuel rods which are each shorter in the active portion than each of said long fuel rods; a plurality of spacers for retaining said fuel rods in spaced relation from each other; a fuel bundle comprising said plurality of fuel rods with said plurality of spacers and disposed between said upper and lower tie plates; a polygonal tube-like channel box which encloses said fuel bundle and constitutes flow paths for coolant; and the concentration of fissile material in each of said short fuel rods being lower than the average concentration of fissile material in the cross-section of said fuel bundle, and in the case where said fuel bundle is vertically subdivided into two regions, an upper and lower one, at the upper end of the active portion of said short fuel rods, the average concentration of fissile material in the cross section of fuel bundle in said lower region is lower than that of said upper region above.

According to another aspect of the invention, there is provided a fuel assembly for a boiling water reactor, which comprises an upper tie plate; a lower tie plate; a plurality of fuel rods which are filled therein with a plurality of fuel pellets, said plurality of fuel rods comprising long fuel rods and short fuel rods which are each shorter in the active portion than each of said long fuel rods; a plurality of spacers for retaining said fuel rods in spaced relation from each other; a fuel bundle comprising said plurality of fuel rods with said plurality of spacers and disposed between said upper and lower tie plates; a polygonal tube-like channel box which encloses said fuel bundle and constitutes flow paths for coolant; and some fuel rods of said fuel rods comprising, as fuel rods containing burnable poison, a first group of fuel rods containing burnable poison, which comprise a plurality of long fuel rods among said long fuel rods and which each contains burnable poison in the greater part of the axial middle region except for the blanket regions at the upper or lower end, or at the upper and lower ends thereof, and a second group of said long or short fuel rods containing burnable poison, which contain burnable poison only in at least one portion of the part corresponding to the axial lower region where said short fuel rods exist. The gadolinia density of the said second group of long or short fuel rod containing burnable poison, prefers to be sufficiently lower than that of the said first group gadolinia containing fuel rod.

In further accordance with the invention, there is provided a fuel assembly for a boiling water reactor, which comprises an upper tie plate; a lower tie plate; a plurality of fuel rods which are filled therein with a plurality of fuel pellets, said plurality of fuel rods comprising long fuel rods and short fuel rods which are each shorter in the active portion than each of said long fuel rods; a plurality of spacers for retaining said fuel rods in spaced relation from each other, a fuel bundle comprising said plurality of fuel rods with said plurality of spacers and disposed between said upper and lower tie plates; a polygonal tube-like channel box which encloses said fuel bundle and constitutes flow paths for coolant; and the concentration of fissile material in at least one portion of said long fuel rods positioned in the vicinity of the middle in the side direction of the outermost periphery of said fuel bundle and adjacent to said short fuel rods (hereinafter referred to as A group of long fuel rods) being lower in at least the axial upper part thereof than that in the fuel rods on the outermost periphery adjacent to said A group of long fuel rods.

In order to achieve the above-described object, according to the invention there is provided a core having type 1 and type 2 fuel assemblies each, a type 1 fuel assembly having more number of said first group of long fuel rods than type 2 fuel assembly, and type 1 fuel assembly having fewer number of said second group of long or short fuel rods containing burnable poison than said type 2 fuel assembly, the said first group of long fuel rods containing burnable poison and which contain burnable poison in a greater part of the axial middle region except for the blanket regions at the upper or lower end, or at the upper and lower ends thereof, the said second group of long or short fuel rods containing burnable poison only in at least one portion of the part corresponding to the axial lower region where said short fuel rod exist.

The gadolinia density of the said second group long or short fuel rod containing burnable poison, prefers to be sufficiently lower than that of the said first group gadolinia containing fuel rod.

In order to achieve the above-described object, according to the invention, there is provided a core having fuel assemblies each including a type 1 fuel assembly having more number of said first group of long fuel rods containing burnable poison which consist of a plurality of long fuel rods among said long fuel rods and when each contains burnable poison in a greater part of the axial middle region except for the blanket regions at the upper or lower end, or at the upper and lower ends thereof, and a type 2 fuel assembly having fewer number of said first group of long fuel rods containing burnable poison than said type 1 fuel assembly, the concentration of fissile material of said type 2 fuel assembly in at least the axial upper portion of at least a part of said long fuel rods adjacent to said short fuel rods and positioned on the outermost periphery of the fuel bundle being lower than the concentration of fissile material in the same axial part of the long fuel rods in the same position as in said type 1 fuel assembly.

In further aspect of the invention, there is provided a core having fuel assemblies each including a type 1 fuel assembly having more number of said first group of long fuel rods containing burnable poison which consists of a plurality of long fuel rods among said long fuel rods and which each contains burnable poison in a greater part of the axial middle region except for the blanket regions at the upper or lower end, or at the upper and lower ends thereof, and a type 2 fuel assembly having fewer number of said first group of long fuel rods containing burnable poison than said type 1 fuel assembly, the concentration of fissile material of said type 2 fuel assembly in at least a part of said A group of long fuel rods being lower in at least the axial upper part thereof than the concentration of fissile material in the fuel rods on the outermost periphery adjacent to said A group of long fuel rods.

In the fuel assembly according to the first invention, since the concentration of fissile material of the fuel pellets filled in each fuel rod can be constituted uniformly in the interior except the upper or lower end or the upper and lower ends, the manufacturing of the fuel rods is greatly facilitated.

Further, since the amount of production of the fission product gas depends on the number of fission, other words burn-up within the fuel rods, lowering the enrichment of the short fuel rods enables the power and burn-up to be lowered the inner pressure increase of the fuel rods. Accordingly, the plenums of the short fuel rods can be made shorter than the plenums of the long fuel rods, with smaller ratio than the ratio in the volume of the pellets between the short fuel rods and long fuel rods, thereby allowing the improvement of fuel economy and the shut-down margin to be achieved.

Moreover, a part of the liquid film formed on the surface of the short fuel rods generally disperses at the top end of short fuel rod and deposits on the surface of long fuel rods adjacent thereto and cools them, and the lower power of the short fuel rods makes thicker liquid film on the surface of the short fuel rods, so that the amount of the liquid film dispersing in the two-phase flow from the upper ends of the short fuel rods and deposit on adjacent long fuel rod surface is increased and the cooling efficiency for the long fuel rods adjacent the short fuel rods is enhanced more, thereby increasing the critical power.

In addition, since the fuel assembly according to the second invention has more fuel rods containing burnable poison in the lower part where the short fuel rods exist, than in the upper part, the infinite neutron multiplication factor in the lower part can be made smaller than in the upper part, particularly at the beginning of the operating cycle, and the downward peak of the axial power distribution at the beginning of the operating cycle, which results from the difference in the reactivity worth of gadolinia between the upper and lower parts due to the difference in the ratios of moderator to fuel, can be mitigated. As a result, the maximum linear heat generating rate at the beginning of the operating cycle is reduced, thereby the thermal margin to be satisfied enough.

Further, in the case where the concentration of burnable poison contained in the second group of short or long fuel rods containing burnable poison is set lower than that contained in the first long fuel rods containing burnable poison, the infinite neutron multiplication factors at the upper and lower parts are as follows:

The infinite neutron multification factor in the lower part is smaller than that in the upper part at the beginning of the burn-up; however, the burn-up proceeds and when the low concentration of burnable poison placed at the lower portion of the second group of fuel rods containing burnable poison has been burned up, the difference in the infinite neutron multiplication factors between the upper and lower parts becomes smaller, and with further proceeding of burn-up, the infinite neutron multiplication factor at the lower part becomes smaller again due to the difference in the number of the fuel rods.

Curve n in FIG. 20 shows, as an example, the infinite neutron multiplication factor in the case where gadolinia of 1.5% concentration is added to the lower portion of two long fuel rods in the fuel assembly with 14 long fuel rods containing gadolinia of 3.5% as described in FIG. 18.

On the contrary, curve p in FIG. 20 in the case where gadolinia of 3.5% concentration is added, making the infinite neutron multiplication factor at the lower part lower during the entire burn-up period until gadolinia is burned out. Curve d in FIG. 20 shows the infinite neutron multiplication factor at the upper part (the part where the short fuel rods do not exist) in the case where gadolinia of 3.5% concentration added in 14 fuel rods.

In the fuel assembly having the characteristic of such an infinite neutron multiplication factor showed with curve n, d, the axial power distribution can be flattened to such a degree as preferable at the beginning of burn-up. On the other hand, since the power distribution becomes a downward peak at the middle of burn-up in operating cycle when the difference of the infinite multiplication factors between the upper and lower parts is smaller, economy can be improved by realization of the spectral shift effect and the downward power peak at the beginning of the following operating cycle can be made mitigated.

That is, when burn-up proceeds with the downward power peak, the infinite neutron multiplication factor gradually becomes larger at the upper part than at the lower part, and therefore, also at the beginning of the operating cycle, the fuel assemblies except new fuel have a property of flattening the axial power distribution of the fuel of the second burn cycle. The longer the fuel assembly experiences the burn-up with the downward power peak, the more effective in axial power flattening.

Further, at the middle of the operating cycle, an increase in the downward power peak does not result in an excessive increase in the maximum linear heat generating rate for the reason as described below.

As shown with curve m in FIG. 19(A), there is a period when the radial power peaking of the reactor core becomes small at the middle of the operating cycle. As an explanation thereof, FIG. 18 has symbols of I and II on the top left side, I denoting the change of the infinite neutron multiplication factor of new fuel during first burn operating cycle and II denoting the change of the infinite neutron multiplication factor of fuel at the second burn cycle.

The radial power peaking appears in the fuel in the second burn cycle with the greatest infinite neutron multiplication factor at the beginning of the operating cycle; however, since the power of the fuel in the second burn cycle decreases along with burn-up and, on the other hand, the power of the new fuel increases, the radial power peaking appears in the new fuel at the end of the first burn operating cycle.

At the middle of the operating cycle therebetween, since the difference in the infinite neutron multiplication factors of the new fuel and the second burn fuel becomes small, the radial power peaking becomes small. Since the maximum power heat generating rate depends upon both the axial and radial power peakings, a downward peak for the axial power distribution can be made without causing an excessive increase in the maximum linear heat generating rate at the middle of the operating cycle with a small radial power peaking.

In the equilibrium core of the said 2 stream design fuel assembly according to the invention, said type 2 fuel assembly is loaded outside the center of the core and said type 1 fuel assembly is loaded in the center of the core. The number of the second group of long or short fuel rods containing burnable poison, in which the burnable poison is contained only in at least a portion of the part corresponding to an axial lower region where the short fuel rods exist, is larger in said type 2 fuel assembly than in said type 1 fuel assembly, so that the downward peak of the axial power distribution outside the center of the core may be suppressed, thereby reducing the maximum linear heat generating rate.

Moreover, the present invention also meets fluctuations in the length of the operating cycle. That is, the above-described type 2 fuel assemblies are usually arranged outside the center of the core; however, if the number of the assemblies to be replaced increases due to extension in the length of the operating cycle, there occur some cases where type 2 fuels are arranged up to the center of the core.

Since the conventional type 2 fuel assembly has fewer fuel rods containing gadolinia and has a larger infinite neutron multiplication factor than the type 1 fuel assembly, when conventional type 2 fuel is arranged in the center of the core, high power and significant downward power peak are caused, bringing about the possibility of an increase in the maximum linear heat generating rate.

However, the present invention makes it possible to suppress the lower axial power peaking of the above-described type 2 fuel assembly even when arranged in the center of the core.

Now, the effect in the transition cycle from the equilibrium core composed only of the fuel assemblies for low burn-up to the equilibrium core composed only of the fuel assemblies for high burn-up will be explained.

The number of the new fuel assemblies for high burn-up in the transition cycle is larger than that of the equilibrium core fully composed with the fuel assemblies for high burn-up because of the low enrichment of the fuel assemblies for low burn-up staying in the transition cycle core.

In this case, in order to keep the excess reactivity with a suitable value, the core is loaded with a number of said type 2 fuel assemblies and the center of the core is also loaded with the same. Since the type 2 fuel assembly has a larger infinite neutron multiplication factor than the type 1 fuel assembly, it has high power and large axial power peaking. Therefore, application of the invention to such a transition cycle also enables to keep the maximum linear heat generating rate to lower level.

Further, since a downward power peak in the equilibrium core is not so significant as in the transition cycle, it is important in the above-described type 1 fuel assembly to select the fewer second group of long or short fuel rods containing burnable poison. Otherwise, excessive suppression of the downward power peak occurs in the equilibrium core, thereby reducing spectral shift effect and lowering economy.

In the fuel assembly according to the third invention, the high burn-up aimed fuel assembly has the long fuel rod arranged on the periphery adjacent to the short fuel rod, and the long fuel rod has the next highest enrichment (has the lower enrichment among the arounded long fuel rod), and at cold shut down state, high density cold water floods and works to help the neutron slowing down over the short fuel rod region on periphery of fuel assembly. So there is high thermal neutron flux and it has the tendency to cause the large local peaking at the cold state. But said long fuel rod arranged on the periphery and adjacent to the short fuel rod, has lower enrichment. So, from the control rod drop accident of view, this invention makes lower local peaking at cold state and results in the smaller fuel rod enthalpy at the accident.

BRIEF DESCRIPTION OF THE DRAWINGS

FIG. 2(A) is a view of axial power distribution in a core at the beginning of a cycle loaded with fuel assemblies in the first and third embodiments of the invention, and FIG. 2(B) is a view of axial power distribution in the core at the end of the cycle;

FIG. 10(A) is a plan view of new fuel arrangement of ¼ of a core in a first transition cycle from an equilibrium core loaded with a fuel assembly for low burn-up to an equilibrium core shown in FIG. 9, and FIG. 10(B) is a characteristic view showing the maximum linear heat generating rate in (A);

FIG. 20 is a characteristic view showing changes in the infinite neutron multification factor for burn-up in the case where gadolinia are added only to two fuel rod in the lower part of the fuel assembly shown in FIG. 13.

EMBODIMENTS

First Embodiment

Figure 16A:
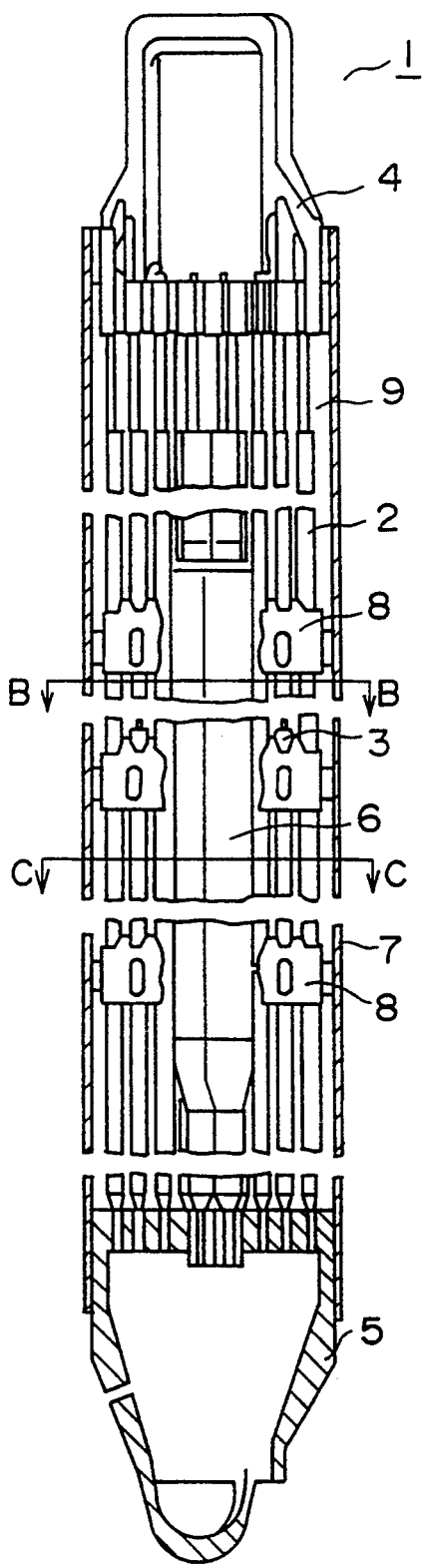
FIG. 16(A) is an elevation view showing a fuel assembly for high burn-up in the prior art with parts partially sectioned.
Figure 16B:
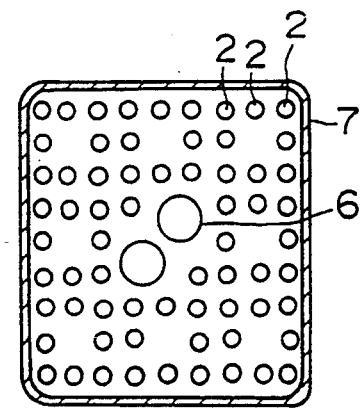
FIG. 16(B) is a sectional view taken along line B—B of FIG. 16(A) and FIG. 16(C) is a sectional view taken along line C—C of FIG. 16(A)
Figure 16C:
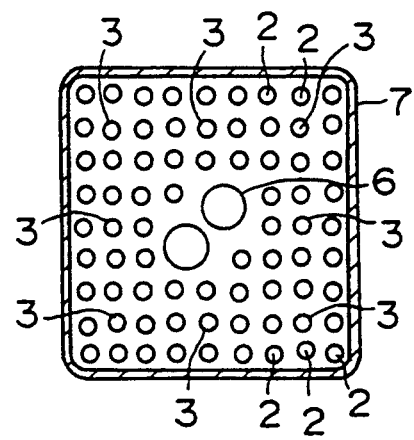
Figure 17A:
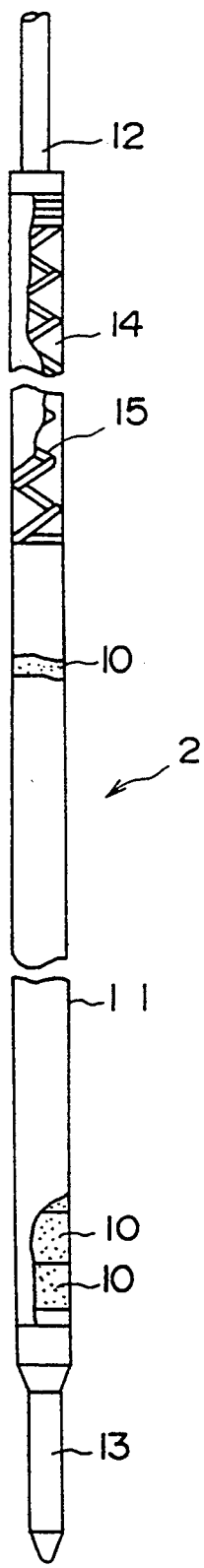
FIG. 17(A) is an elevation view showing a long fuel rod, with parts partially sectioned, of the fuel assembly in FIG. 16.
Figure 17B:
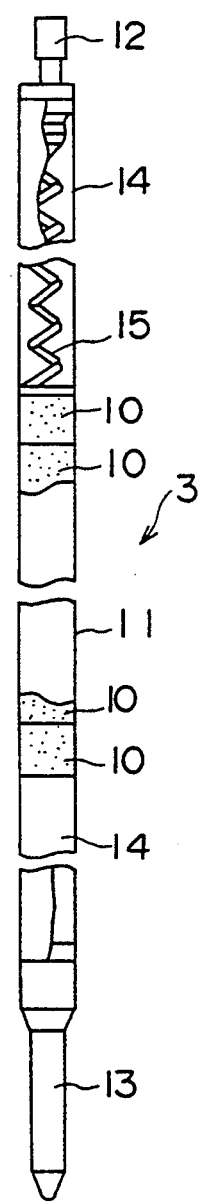
FIG. 17(B) is an elevation view showing a short fuel rod with parts partially sectioned.
Figure 18:
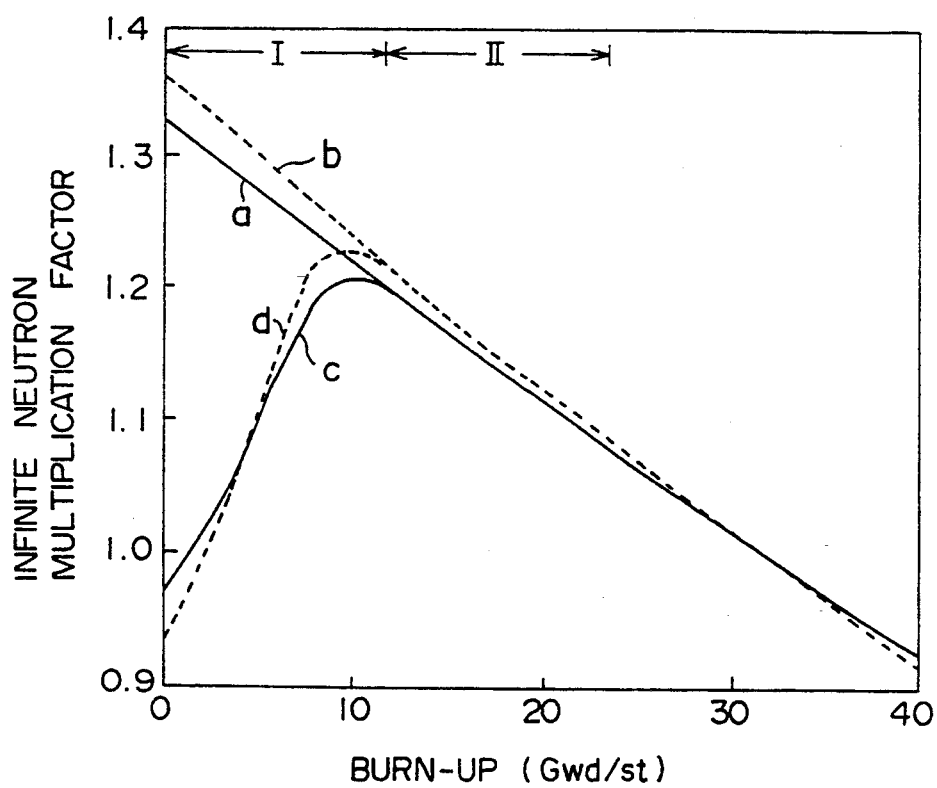
FIG. 18 is a characteristic view showing changes in the infinite neutron multiplication factor for burn-up at 40% void fraction condition in the fuel assembly in FIG. 16.

A first embodiment of the fuel assembly according to the present invention will now be explained by referring to FIG. 1. In the first embodiment, a high burn-up aimed fuel assemblies shown in FIG. 16 are applied. The fuel rods arrangement is a square matrix with 9 lines and 9 rows, and a fuel rods bundle has 66 long fuel rods 2, 8 short fuel rods 3, and 2 water rods 6 of a large diameter. The total length of long fuel rod 2 is approximately 410 cm, approximately 370 cm of which is an active portion with which fuel pellets are filled. The whole length of short fuel rod 3 is approximately 260 cm, approximately 220 cm of which is an active portion.

Natural uranium pellets are filled at the portions of upper end over a length of approximately 30 cm and the lower end over a length of approximately 15 cm (these regions being referred to as "blanket regions") in the effective portion of the long fuel rod 2. The enrichment of the central active portion which is an approximately 325 cm is uniform in the axial direction. The order of the enrichments of the fuel rods 2 and 3 is, form high to low, $A>B>C>D>E$. The enrichment E of the short fuel rod 3 is lower than any of the enrichments A to D of the long fuel rods 2 except for the upper and lower end portions filled with the natural uranium pellets.

In this embodiment, gadolinia is contained in the interior of 14 fuel rods represented by numerals 6 and 7 except for the upper and lower ends thereof which are filled with natural uranium, the order of the gadolinia content thereof being, from high to low, $HG>MG>LG$. In the 10 rods represented by numeral 6, the concentration of gadolinia is higher in the lower portion than a higher portion bounded at the upper end of the active portion of the short fuel rods 3. Such a concentration distribution of gadolinia makes it possible to prevent a bundle axial power distribution from the tendency of becoming a downward power peak in a middle stage of the operation cycle.

As a result of such a constitution of respective fuel rods, the average enrichment of the fuel assembly can be set so that the enrichment of the upper portion is approximately 0.34% higher than that of the lower portion bounded at the upper end of the active portion of the short fuel rods 3. Also, when a simple uniform enrichment design is made in the axial direction in the active portions of the long and short fuel rods except for the upper and/or lower ends, the difference of the enrichments between the upper and lower portions of entire fuel bundle can be obtained in order to flatten the axial power distribution. Generally, such an enrichment difference is required to be approximately 0.1 to 0.3 w/t. In the first embodiment of the present invention, this is sufficiently possible.

The core averaged axial power distributions in the axis direction in an equilibrium cycle of the core with the fuel assemblies according to the present invention are shown in FIGS. 2(A) and (B) as solid lines q. By using the low enrichment short fuel rods, the cross-sectional average enrichment can become lower at the lower portion than at the higher portion, and by setting the concentration distribution of gadolinia as described above, a value of axial power peaking is maintained at approximately 1.3 or lower; thus, a thermal margin can be fully satisfied without a complicated enrichment axial distribution design within the fuel rods.

In the case of a boiling water reactor, since water is not boiled outside of channel box 7 as shown in FIG. 16, there is a tendency that within the full rods bundle cross-section, the nearer to the outside the fuel rod is, the higher the rod power is. Accordingly, in the case of the first embodiment shown in FIG. 1, the nearer to the outside the fuel rod is, the lower the rod enrichment is set so as to ensure the lowering of the local output peaking.

Consequently, in the conventional design method where the transverse power distributions in the horizontal cross-section of the fuel bundles are to be set flatten, the short fuel rods 3 arranged in the interior should originally have a higher enrichment in comparison with the long fuel rods represented by numerals 3 and 4. However, in the case of this embodiment, the power peaking of the fuel rods represented by numerals 3 and 4 are reduced by placing 4 low enrichment short fuel rods at the positions where adjacent to rod 3 in the vicinity of corner rod 4 (the positions of the four corners located in the 2nd row from the outer side).

In this embodiment, the local power peaking can be reduced to 1.4 or less at the lower part and to 1.3 or less at the upper part. It is, therefore, important to place the short fuel rods, on at least the positions of the four corners located in the 2nd row from the outer side, and to select the lower enrichments.

Since the enrichment of each short fuel rod 3 is lower than that of any of the long fuel rods 2, the power of the short fuel rods 3 is equal to or less than half the power of the long fuel rods 2. For this reason, a thicker liquid water film is formed on the surface of the upper end of the short fuel rod 3, and this liquid water film disperses into water droplets, then deposit on the surface of the long fuel rod 2 adjacent to the corresponding short fuel rod to enhance the long fuel rod cooling.

As a result, the critical power can be improved since the efficiency for cooling the long fuel rods 2 can be improved without lowering the enrichment of the long fuel rods 2 adjacent to the short fuel rod 3.

Figure 1A:
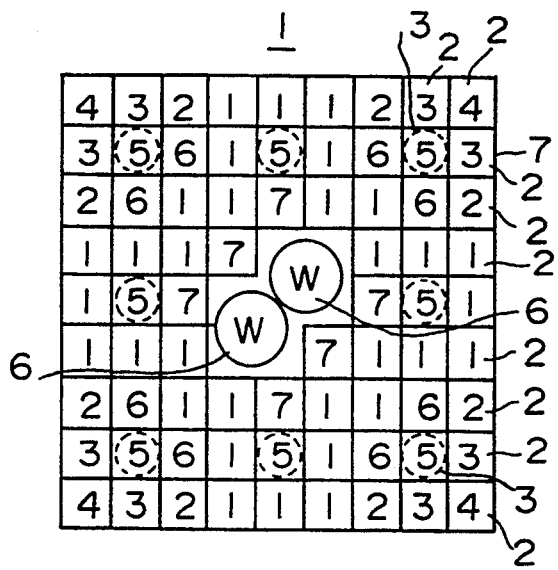
FIG. 1(A) is a plan view showing a condition of arrangement of fuel rods in a first embodiment of a fuel assembly according to the invention.
Figure 1B:
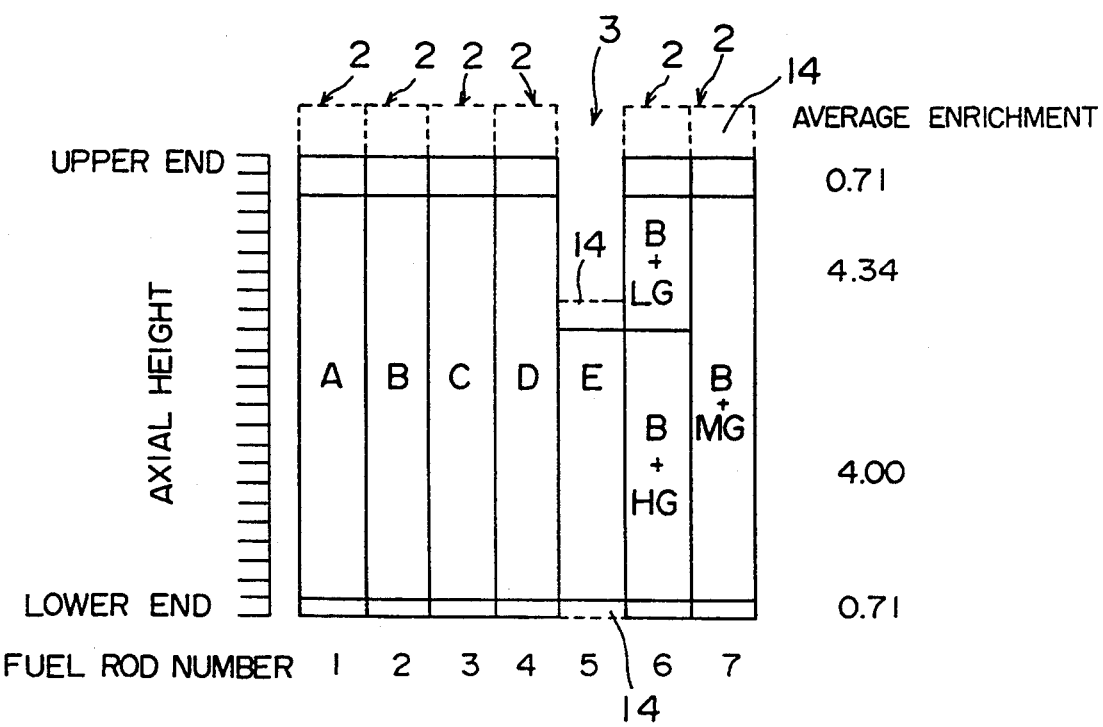
FIG. 1(B) is a view of axial distribution of the enrichment and gadolinia content of the fuel rods in FIG. 1(A)

Besides, by lowering the enrichment of the short fuel rods 3 on the basis of this embodiment and installing a mixing blade for mixing a coolant flow as shown in FIG. 1 of JPA 144290 (1988) at the upper end of the short fuel rods, the coolant flow at the upper end of the short fuel rods can be used more effectively for cooling the long fuel rods adjacent to the short fuel rods.

As described above, according to the present invention, in spite of a very simple enrichment axial distribution design of the fuel rods, flattening of the axial power distribution of the fuel assembly can be realized and, at the same time, such a design can contribute to the enhancement of the critical power. In this embodiment, while the natural uranium region(s) is(are) placed in the upper and/or lower ends of the active portion of the fuel rod, depleted uranium, tail uranium, or recycled uranium may be used instead of natural uranium.

Second Embodiment

In the first embodiment, about 40 cm of plenum 14 are provided in an upper portion of the long fuel rod 2, and about 25 cm of plenum and about 15 cm of plenum 14 are provided at an upper and lower portions in the short fuel rod 3, respectively. The lower plenum of the short fuel rod 3 exactly corresponds to the lower natural uranium region of the long fuel rod 2. That is, the entire lengths of the plenums of the long fuel rod 2 and that of the short fuel rod 3 are substantially equal to each other.

However, in the first embodiment where the enrichment of the short fuel rod 3 is lower than the enrichment of any of the long fuel rods 2, the power of short fuel rod 3 is not more than half the power of the long fuel rod 2. Consequently, the plenum length of the short fuel rod 3 can be made shorter than the plenum length shortened in proportion to the fuel active length between short rod 3 and long rod 2 and the increase in the inner pressure due to the fission gases can sufficiently be suppressed.

Figure 3:
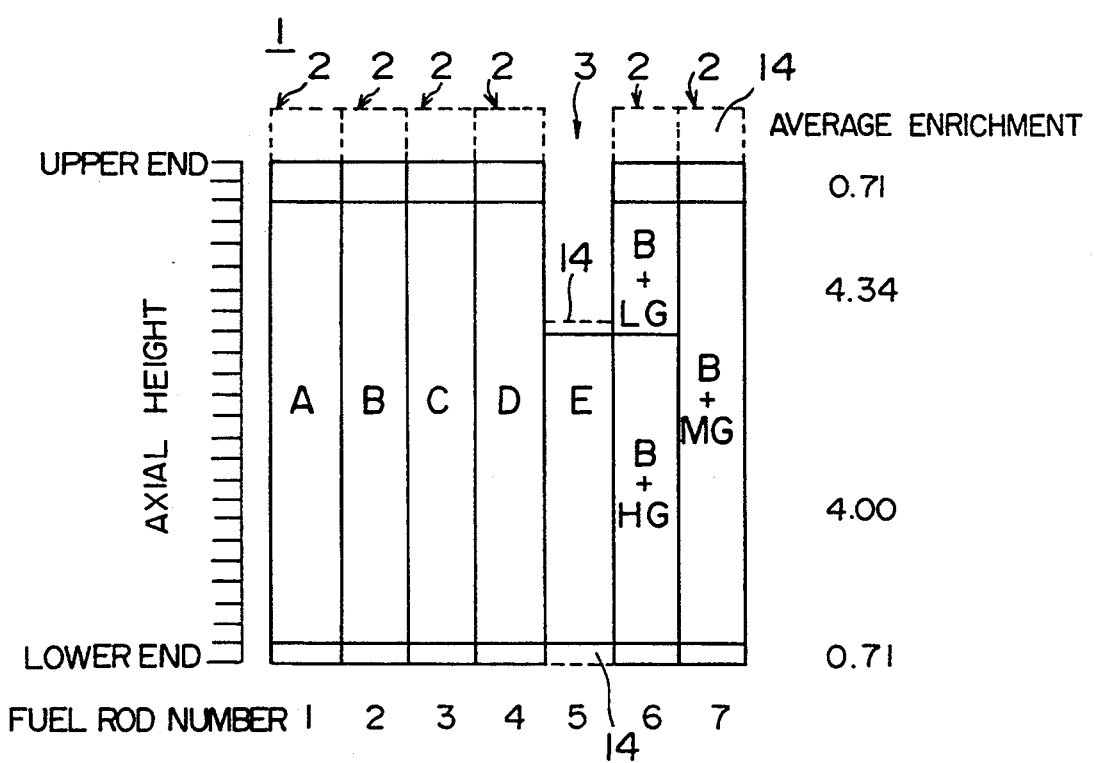
FIG. 3 is a view of axial distribution of the enrichment and gadolinia content in a second embodiment of a fuel assembly according to the invention.

In the second embodiment which is shown in FIG. 3, the active length of short fuel rods 3 is extended by 20 cm in the upper direction, and the total length amount to 240 cm, and the length of the upper plenum 14 is shortened approximately 5 cm in according therewith. In this embodiment, since the active length of the short fuel rod can be extended and a fuel inventory can be increased approximately 6%, the fuel economy can be improved accordingly. At least 5 cm length of the upper plenum of the short fuel rod is required in order that the spring is effectively acted.

In the first and second embodiments, the boundary position between the upper and lower part of the fuel rod containing gadolinia is positioned by the upper end of the active portion of the short fuel rod, but this boundary position may be changed. For example, the boundary position may be set at the position of from L/3 to L/2 based on the lower end of the active length L of the fuel assembly as in the case of the conventional technique. In this case, the axial power distribution of the new fuel can be controlled more flat from the initial to the middle stages of the operating cycle.

Third Embodiment

Figure 4A:
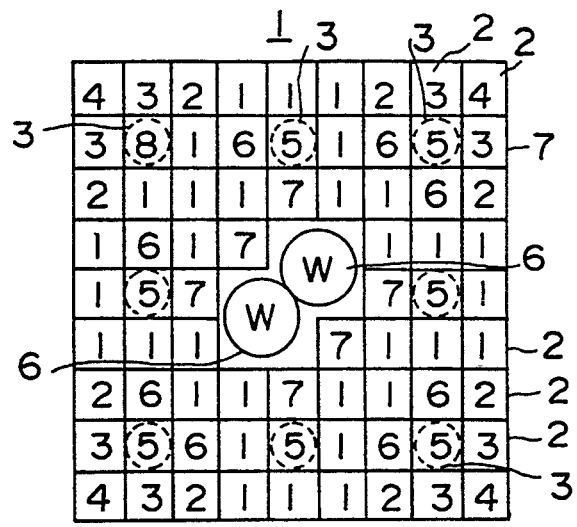
FIG. 4(A) is a plan view showing a condition of arrangement of fuel rods in a third embodiment of a fuel assembly according to the invention.
Figure 4B:
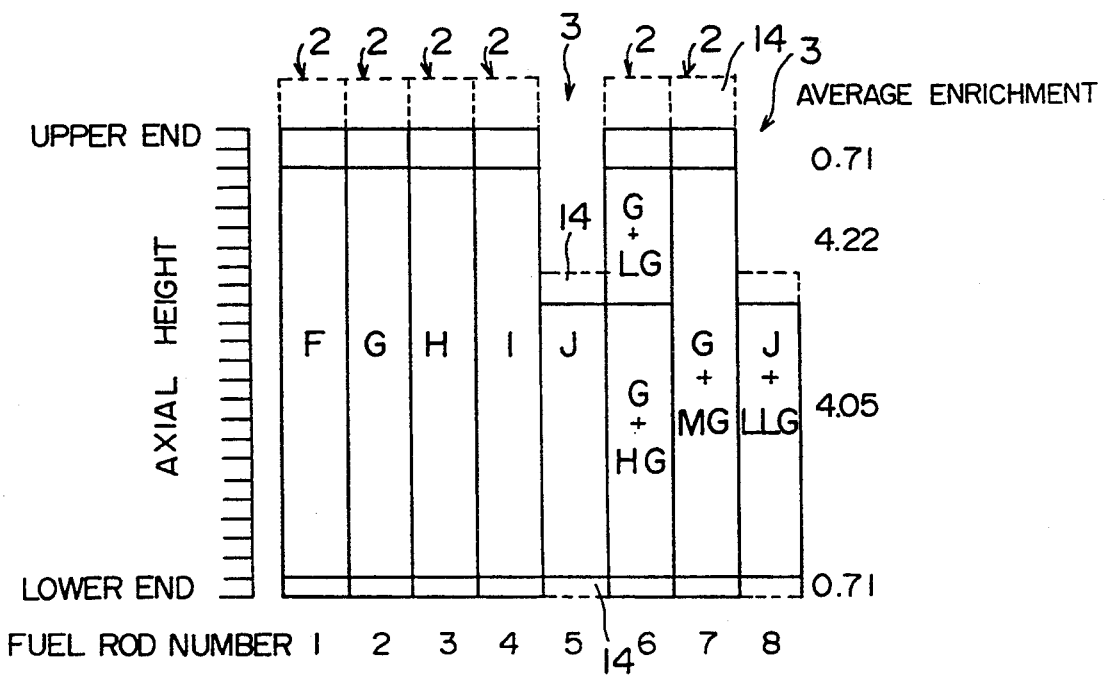
FIG. 4(B) is a view of axial distribution of the enrichment and gadolinia content of the fuel rods in FIG. 4(A)

The third embodiment of the present invention is shown in FIG. 4. In this embodiment, two kinds of short fuel rods 3 represented by numeral 5 and 8 are used. One of the short fuel rods represented by numeral 8 contains gadolinia in a concentration, LLG, being lower than the gadolinia concentrations, LG, MG, and HG, contained in the other fuel rods. The order of enrichments of the fuel rods is, from high to low, F>G>H>J>I. The enrichment, J, of the short rod is lower than the average enrichment of the horizontal cross-section of bundle, but is higher than the enrichment, I, of the long fuel rod 4. The enrichments, F to I, of the long fuel rods according to this embodiment are lower than the enrichments, A to D, of the long fuel rods according to the first embodiment, by 0.1% to 0.2%. As a result, the difference of the average enrichment in the horizontal cross-section of bundle, between the upper and lower portions amounts to 0.17%, which is approximately half that of the first embodiment.

The axial power distribution in the case of this embodiment is shown in FIG. 2 as plotted with dots, r. Since one gadolinia fuel rod is added in the lower part of this embodiment, resulting in a decrease in the reactivity of the lower portion of the fuel assembly, the axial power distribution is flattened enough with the smaller enrichment difference between the upper and lower portion than that of the first embodiment.

Fourth to Seventh Embodiments

In the fourth to sixth embodiments of the present invention, the horizontal cross-section configure and the enrichment distribution of the fuel assembly are the same as those shown in FIGS. 1 (A) and (B), but only the boundary positions of the gadolinia concentration of the gadolinia-containing fuel rods represented by numeral 6 is different from the first embodiment. To be specific, whereas in the case of the first embodiment shown in FIG. 1 (B), the boundary position of the gadolinia concentration of the gadolinia-containing fuel rods represented by numeral 6 is located at the upper end of the active portion of short fuel rod 3 represented by numeral 5, in the case of the fourth and fifth embodiments, the boundary positions are shifted approximately 60 cm upwardly or downwardly, respectively. In the sixth embodiment, the concentration of gadolinia is uniform in the axial direction.

Since differences of the gadolinia concentrations have hardly any influence upon the power distribution at the beginning of cycle in these embodiments, the axial power distributions cannot be distinguished from the distributions of the first embodiments shown in FIGS. 2 (A) and (B) at the beginning of the cycle in these embodiments. Although the axial power distributions at the end cycle are somewhat different from them, they are within the narrow range in all the embodiments. In the case of the sixth embodiment where the gadolinia concentration is uniform in the axial direction, however, the axial power distribution becomes downward power shape, resulting in an increase in power peaking as shown as plotted with dots r in FIG. 2 (B) at the middle to end of cycle but the peaking is under approximately 1.3 or less. As described above, although the axial power peaking somewhat increases in the case of the sixth embodiment, the assembling is mostly simplified in this embodiment since not only the uniform axial enrichment distribution in all fuel rods except for the upper and lower ends, but also the gadolinia uniform concentration distribution.

In the seventh embodiment, only the axial enrichment distribution of the short fuel rod represented by numeral 5 is different from that of the first embodiment, which is shown in FIGS. 1 (A) and (B). In this embodiment, at the portion of 5 to 15 cm of the upper end of the active portion of the short fuel rod, natural uranium oxide pellets are filled in instead of enriched uranium oxide pellets witch an enrichment E. In the short fuel rods, since there is an enough coolant at the portion above the upper end, (the short fuel rods are surrounded by much more moderator than the long fuel rods adjacent the upper end of short rod) so power peak result. In this embodiment, such peaks are reduced by sufficiently low enrichment at the portions where large power peak is liable to occur.

The fourth to sixth embodiments described above are modified embodiments of the first embodiment, and it is obvious that similar modified embodiments can be made to the second and third embodiments. In the all embodiments described above, the enrichment of the short fuel rod is different from the enrichment of any of the long fuel rods, but an embodiment can be applied where the enrichment of any of the short fuel rods is equal to the enrichment of any of the long fuel rods that has a lower enrichment than average enrichment within the cross-section at the central portion in the fuel axial direction.

Furthermore, although the explanation described above is made taking into consideration the use of uranium-235 as a fissile material, fissile Pu or mixture of uranium-235 and fissile Pu can similarly be applied. Particularly, in the case of utilizing MOX fuel pellets, it is extremely advantageous for the concentration of the fissile substance of the MOX fuel rod in the axial direction to be uniform.

According to the present invention, the average enrichment within cross section of the fuel assembly can be set higher at the upper portion than at the lower portion. This makes it possible to use the uniform enrichment distribution of the fuel pellets at the central portion except for the upper and/or lower portions in each fuel rod, thus, the production stages of the fuel rods can be drastically simplified. As a result, the cost for producing fuel can be saved.

Moreover, a sufficiently decreased enrichment of the short fuel rod, reduces the amount of fission product gases, and keep the inner pressure of the fuel rods under low level. Consequently, the plenum of the short fuel rod can be designed so as to be shorter than prior art, achieving an improved fuel economy due to increased fuel inventory and an increased shut down margin of the reactor.

Furthermore, since the liquid water film on the surface of the short fuel rod become thicker, cooling water with more water-droplets flows along the long fuel rod in the vicinity of the short fuel rod, the critical power thereby being increased.

Eighth Embodiment

Figure 5A:
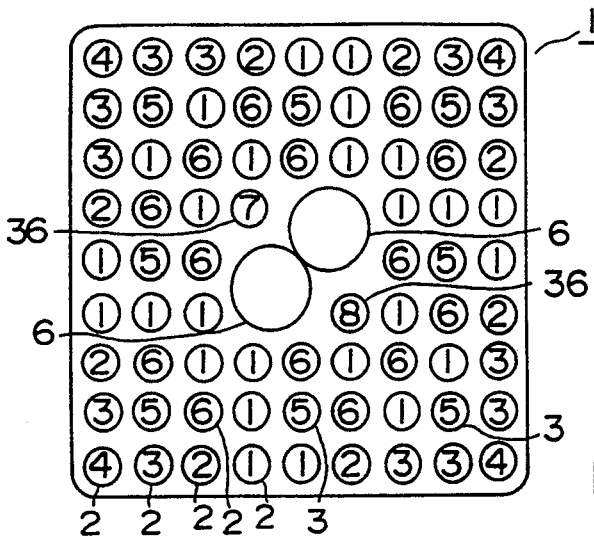
FIG. 5(A) is a plan view showing a condition of arrangement of fuel rods in an eighth embodiment of a fuel assembly according to the invention.
Figure 5B:
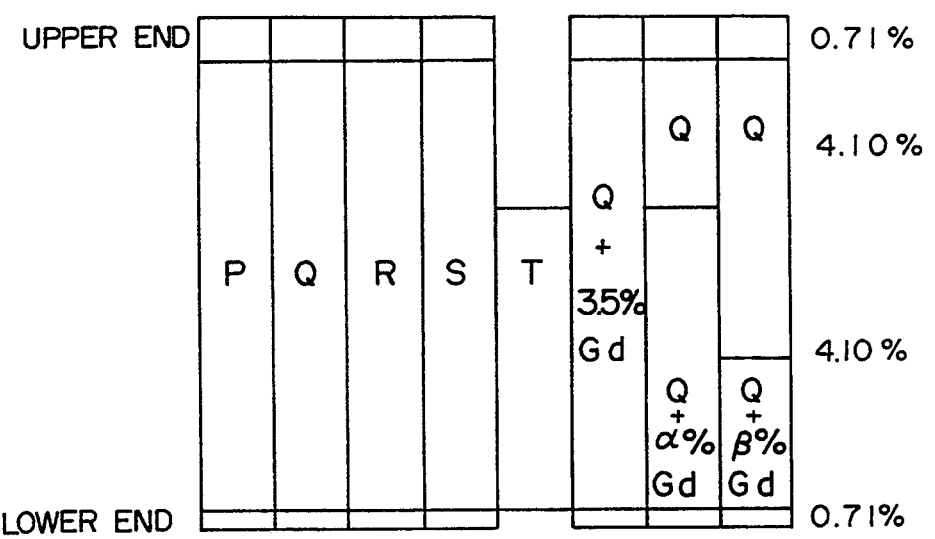
FIG. 5(B) is a view of axial distribution of the enrichment and the concentration of gadolinia of each of the fuel rods in FIG. 5 (A)
Figure 6A:
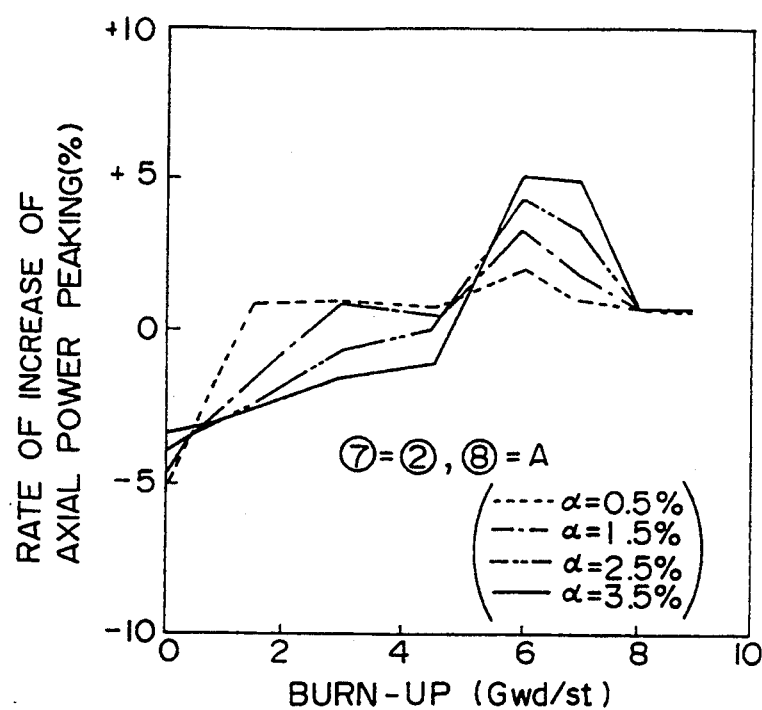
FIG. 6 is a characteristic view showing a rate of increase of axial power peaking in the core loaded with the fuel assemblies of the eighth embodiment according to the invention as compared with a conventional example, FIG. 6(A) showing the case where the concentrations of gadolinia are changed in a said second group of gadolinia containing fuel rods and FIG. 6(B) showing the case where the number of the second group of gadolinia containing fuel rods is changed, or the length of the region is changed in the second group of gadolinia containing fuel rods.
Figure 6B:
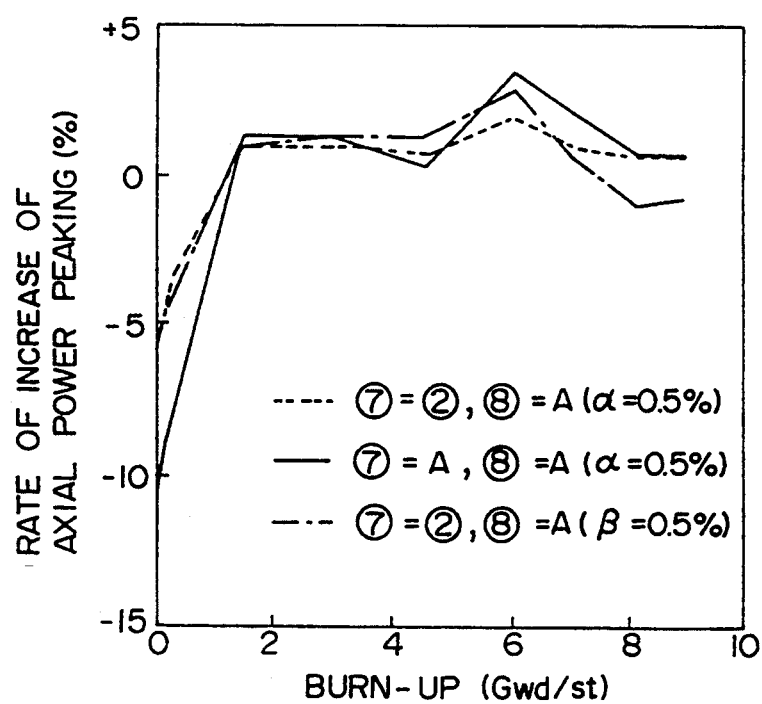

A high burn-up aimed fuel assembly which is an eighth embodiment according to the present invention is shown in FIGS. 5 and 6. FIG. 5(A) shows a horizontal cross-sectional configure of fuel assembly 1, and also FIG. 5(B) shows the axial distribution of enrichment and gadolinia content in each rod of FIG. 5(A). In FIG. 5(A), the symbol shows fuel rod types and correspond to the fuel rod types shown in FIG. 5(B).

The fuel assembly in accordance with this eighth embodiment has a construction similar to that of the fuel assembly shown in FIG. 16. As shown in FIG. 5(A), the fuel rods arrangement is a square matrix with 9 lines and 9 rows, and a fuel rods bundle is comprised of 66 long fuel rods 2, 8 short fuel rods 3, and 2 water rods 6 of large diameter. The lengths of the active portions with which fuel pellets are filled are approximately 370 cm for the long fuel rods 2, and approximately 220 cm for the short fuel rods.

Oxide pellets of natural uranium, or depleted uranium, or recycled uranium are filled at the upper end about 30 cm and the lower end about 15 cm (these regions being referred to as "blanket regions"), in the long fuel rod 2. The enrichment of the approximately 325 cm central portion is axial uniform distribution, and the order of enrichments of the fuel pellets in the fuel rods are, from high to low, $P>Q>R>S$.

The enrichment of the short fuel rod 3 is equal to the horizontally cross sectional averaged enrichment of the fuel assembly, which amounts to 4.1%. Consequently, with the exception of the upper and lower end (natural uranium portions), the horizontally cross sectional averaged enrichment is uniform in the axial direction. The enrichment of the short fuel rod may be lower than the horizontally cross sectional averaged enrichment. The average enrichment including the upper and lower natural uranium portions is approximately 3.7%.

The long fuel rods represented by numeral 6 contains gadolinia in a concentration of approximately 3.5% except for the upper and lower ends thereof which are filled with natural uranium and constitute the first group of the long fuel rods containing a burnable poison according to this embodiment.

The long fuel rods represented by numerals 7 and 8 in FIG. 5(A) are any of the two type long fuel rods, one is represented by symbols A or B in FIG. 5(B) which are the second group of the long fuel rods containing a burnable poison only in the lower region in the axial direction where the short fuel rods exist, another is the long fuel rods represented by numeral 2 containing no gadolinia.

The long fuel rod represented by symbol A contains gadolinia in a concentration of α% at the portion corresponding to the whole length of the short fuel rod, while the long fuel rod represented by symbol B contains gadolinia in a concentration of β% at the portion corresponding to one half of the active portion of the short fuel rod.

FIGS. 6(A) and (B) shows the comparison of the axial power peakings in an equilibrium cycle core between the prior art and this embodiment relative to prior art. In the base case, the conventional fuel assembly is loaded, where both of the long fuel rods 2 represented by numerals 7 and 8 contain no gadolinia, and in this embodiment case core, the fuel assembly according to the present embodiment is loaded.

Moreover, in order to examine a spectral shift effect according to this embodiment, the effective multiplication factor at the end of cycle is shown in Table 1 as an increment relative to that of the conventional fuel assembly.

FIG. 6 (A) shows the case where the fuel rod represented by numeral 7 in FIG. 5(A) is the long fuel rod represented by numeral 2 FIG. 5(B), the fuel rod represented by numeral 8 in FIG. 5(A) is the long fuel rod represented by symbol A in FIG. 5(B), and the gadolinia concentration, α, is varied within the range between 0.5% and 3.5%.

Figure 19A:
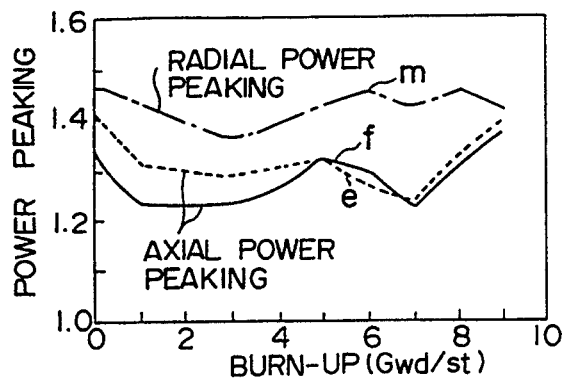
FIG. 19(A) is a characteristic view showing power peakings of the core loaded with fuel assembly composed of 66 of long fuel rods and 8 of short fuel rods or with the fuel assembly composed only of 74 of long fuel rods.

According to this embodiment, the axial power peaking at the beginning of the cycle is especially decreased, and this effect is more significant as the gadolinia concentration is lower in the long fuel rod A or B in FIG. 5(B). In the case where the gadolinia concentration is low, the axial power peaking at the middle of cycle is somewhat increased, but since the radial power peaking at this time is small as shown in FIG. 19(A), the increase in the maximum linear heat generating ratio make no problem.

The downward power peak at the middle stage of the cycle enhances the spectral shift effect to increase the effective multiplication factor at the end of cycle.

On the other hand, in the case of a high concentration of gadolinia, since the downward power peak at the middle of cycle is insufficient, the burn-up at the lower portion proceeds insufficiently, resulting in increase of the axial power peaking at the lower portion at the beginning of cycle, (i.e., at the second burn cycle fuel) and at the latter half stage (i.e., at the first burn cycle fuel).

Figure 19B:
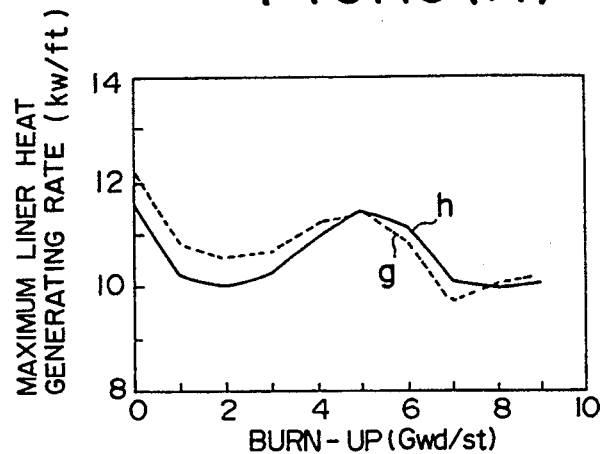
FIG. 19(B) is a characteristic view showing the maximum linear heat generating rate in respective case.
Figures 19C, 19D:
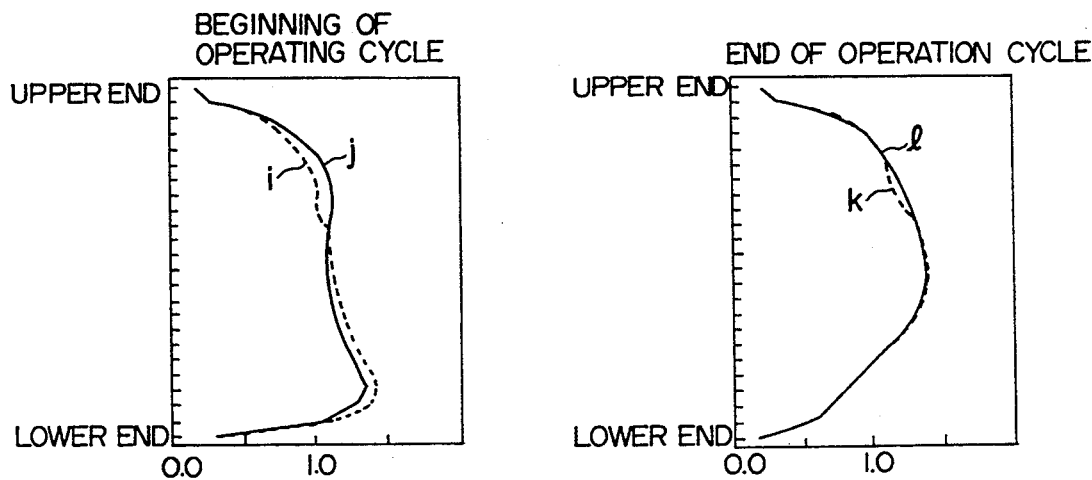
FIG. 19(C) is a view of axial power distribution at the beginning of operating cycle.
FIG. 19(D) is a view of axial power distribution at the end of operating cycle.

As shown in FIG. 19 (A) by curve m, the radial power peaking become smallest at the time at which about ⅓ length of cycle from the beginning of cycle, so the concentration of the gadolinia contained in the second group of the fuel rods containing a burnable poison is desirably about ½ of the concentration of gadolinia contained in the first group of the fuel rods containing a burnable poison, and preferably as low as possible within the range capable of production.

FIG. 6 (B) shows the relative increase to prior art of the core average axial power peaking in the case of various combinations of the fuel rods represented by numerals 7 and 8. The gadolinia concentrations contained in the lower portions of the long fuel rods represented by symbols A and B are always 0.5%.

When the both fuel rods represented by numeral 7, 8 are the long fuel rods represented by symbol A, the axial power peak at the beginning of cycle is drastically improved, although the spectral shift effect is somewhat decreased.

When the fuel rods represented by numeral 8 are the long fuel rods represented by symbol B instead of the long fuel rods represented by symbol A, although the axial power at the beginning of the cycle is somewhat decreased, the spectral shift effect is reduced by half.

As described above, the lower the gadolinia concentration is, the more the thermal margin and economy are improved. However, in any other rod combination, since the improvement in thermal margin and the improvement in the economy are in disagreement with each other, an appropriate combination should be selected as occasion may demand.

TABLE 1

| Fuel rod represented by numeral 7 | No. 2 | No. 2 | No. 2 | No. 2 | A | No. 2 |
|---|---|---|---|---|---|---|
| Fuel rod represented by numeral 8 | A | A | A | A | A | B |
| Gadolinia concentration (%) α | 0.5 | 1.5 | 2.5 | 2.5 | 0.5 | — |
| β | — | — | — | — | — | 0.5 |
| Increment of effective multiplication factor at the end of cycle (% Δk) [Effective magnification at the last stage of the run cycle (% Δ k)] | 0.19 | 0.16 | 0.13 | 0.11 | 0.16 | 0.09 |

As the position of second group of burnable poison-containing fuel rods with low gadolinia content, fuel rods represented by numeral 36 in in FIG. 5 (A), in the vicinity of two water rods 6 with large are diameter are suitable. At the positions represented by numeral 36, the thermal neutron flux is high and, thus, the reactivity worth of gadolinia is large, resulting in fast burn-up of gadolinium. Consequently, since the large effect is gained with fewer number of the second group of burnable poison-containing fuel rods, making the gadolinia concentration low, it is advantageous to control the axial power distribution.

Furthermore, because gadolinia containing oxide fuel pellet has a low thermal conductivity and the fuel rod temperature tends to grow up, the linear heat generating rate is lowered in the fuel rods containing gadolinia by the decrease of enrichment, and the decreasing range depends on the gadolinia concentration. When a high concentration of gadolinia is used at the positions represented by numeral 36 in FIG. 5(A), at which the thermal neutron flux is high, it is required to sufficiently lower the enrichment of the fuel rods.

As a result, since the enrichment of the fuel rods containing no gadolinia should be increased to keep same bundle average enrichment, the local power peaking of the fuel assembly increases. In contrast, if the gadolinia concentration is low, the enrichment may not be so lowered so much and, therefore, there is no problem of an increase of local power peaking.

Ninth Embodiment

Figure 7A:
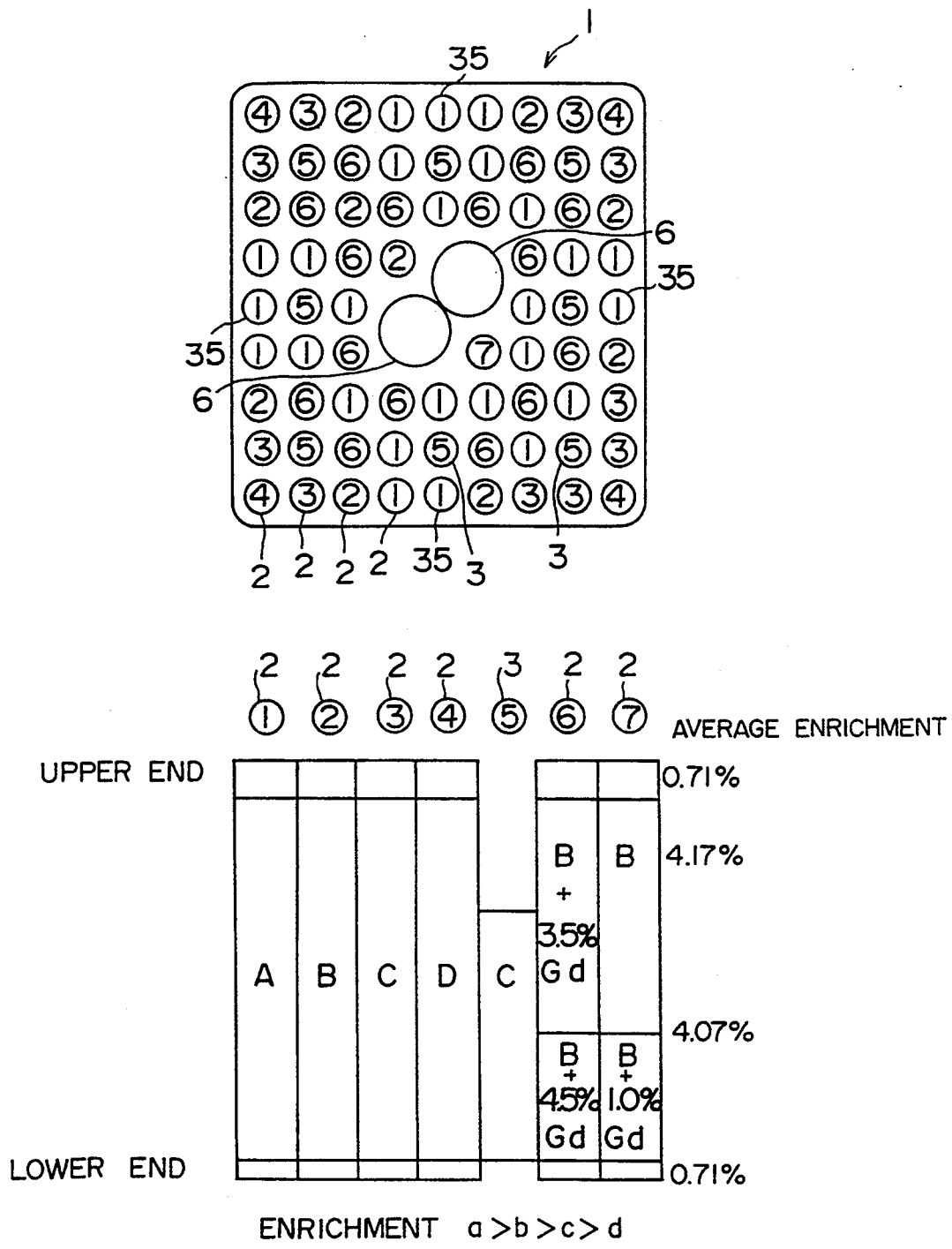
FIG. 7 are plan views showing a condition of arrangement of fuel rod and views of axial distribution of the enrichment and gadolinia content in each of the fuel rods of said 2 stream fuel assemblies in a ninth embodiment of the invention, (A) and (B) showing a type 1 fuel assembly and a type 2 fuel assembly, respectively.
Figure 7B:
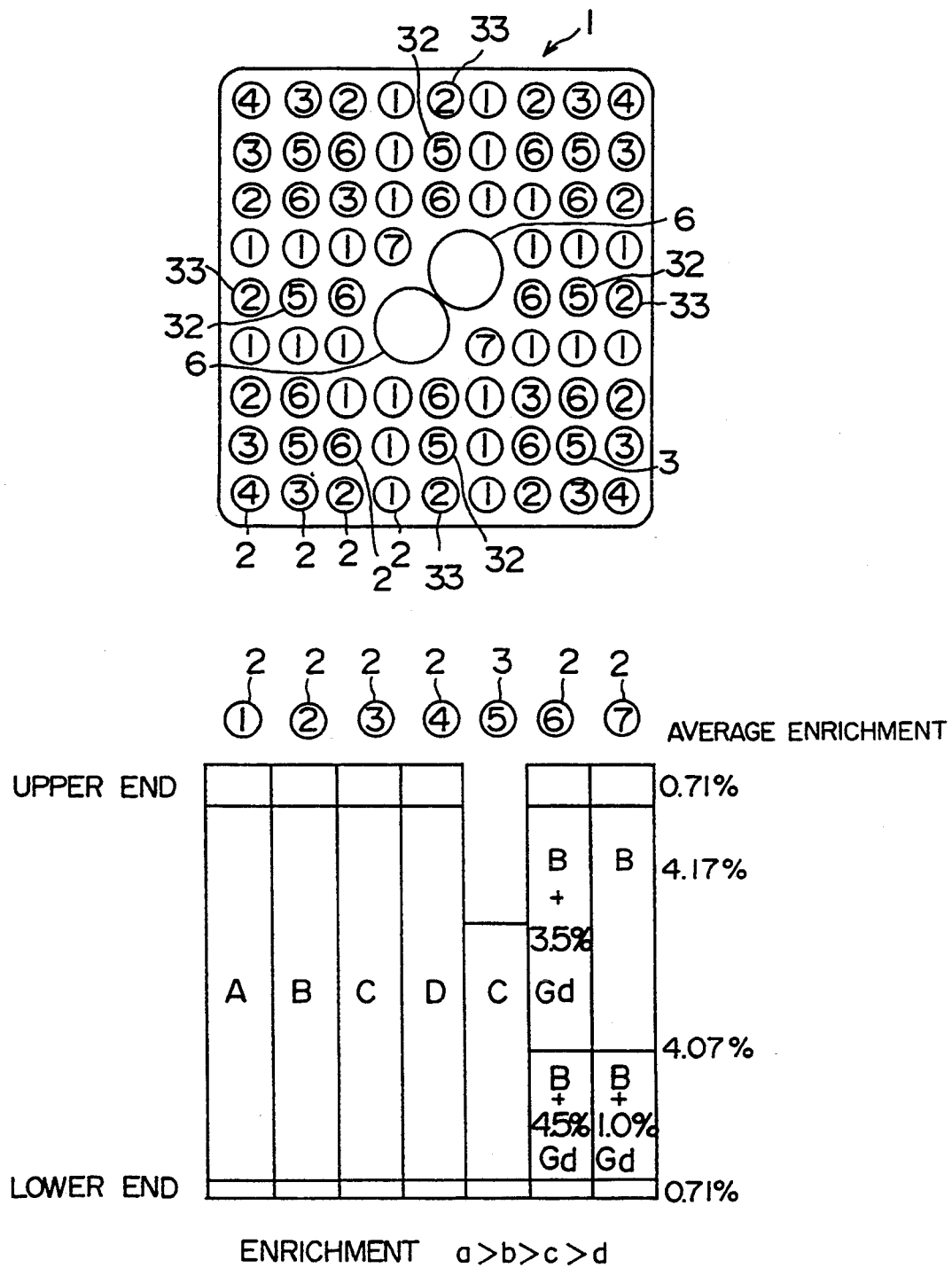

A 2 stream design fuel assembly, which is the ninth embodiment of the present invention, is described by referring to FIG. 7. FIG. 7 (A) shows a type 1 fuel assembly and FIG. 7 (B) shows a type 2 fuel assembly. Similar to that of the first embodiment, the assembly of this ninth embodiment has a construction similar to the high burn-up aimed fuel assembly as shown in FIG. 16. Consequently, the description of the same portions are omitted.

Natural uranium pellets are filled at the portions of the upper end of about 30 cm and the lower end of about 15 cm in the active portion of each long fuel rod 2, approximately 325 cm in the central portion having an axial uniform enrichment distribution. The order of the enrichments of the fuel pellets filled in the fuel rods are, from high to low, A>B>C>D, the enrichments of the short fuel rods is C.

As a result, the horizontally cross sectional averaged enrichment of the assembly is so axially distributed that the enrichment of the upper portion is approximately 0.1% higher than that of the lower portion bounded at the upper end of active length of the short fuel rods 3. The average enrichment of the assembly included the upper and lower ends where the natural uranium oxide pellets are filled is approximately 3.7%.

In the type 1 fuel assembly, 15 long fuel rods represented by numeral 6 contain gadolinia, in the central regions except for the upper and lower end portions where the natural uranium oxide pellets are filled. The gadolinia concentration is higher in a lower portion than in the higher portion bounded at the near center of the active portion of the short fuel rods 3. Such an axial gadolinia concentration distribution particularly may prevent the downward peak at a latter half stage of cycle.

In one long fuel rod represented by numeral 7, gadolinia is only contained in a concentration of 1% in the portion below the center in elevation of the short fuel rod active part which particularly prevents a lower peak at the beginning of the cycle.

In the type 2 assembly, 12 long fuel rods represented by numeral 6 and 2 long fuel rods represented by numeral 7, have the same gadolinia distribution respectively as described in the fuel rods of the type 1 fuel assembly represented by the corresponding number.

Figure 8A:
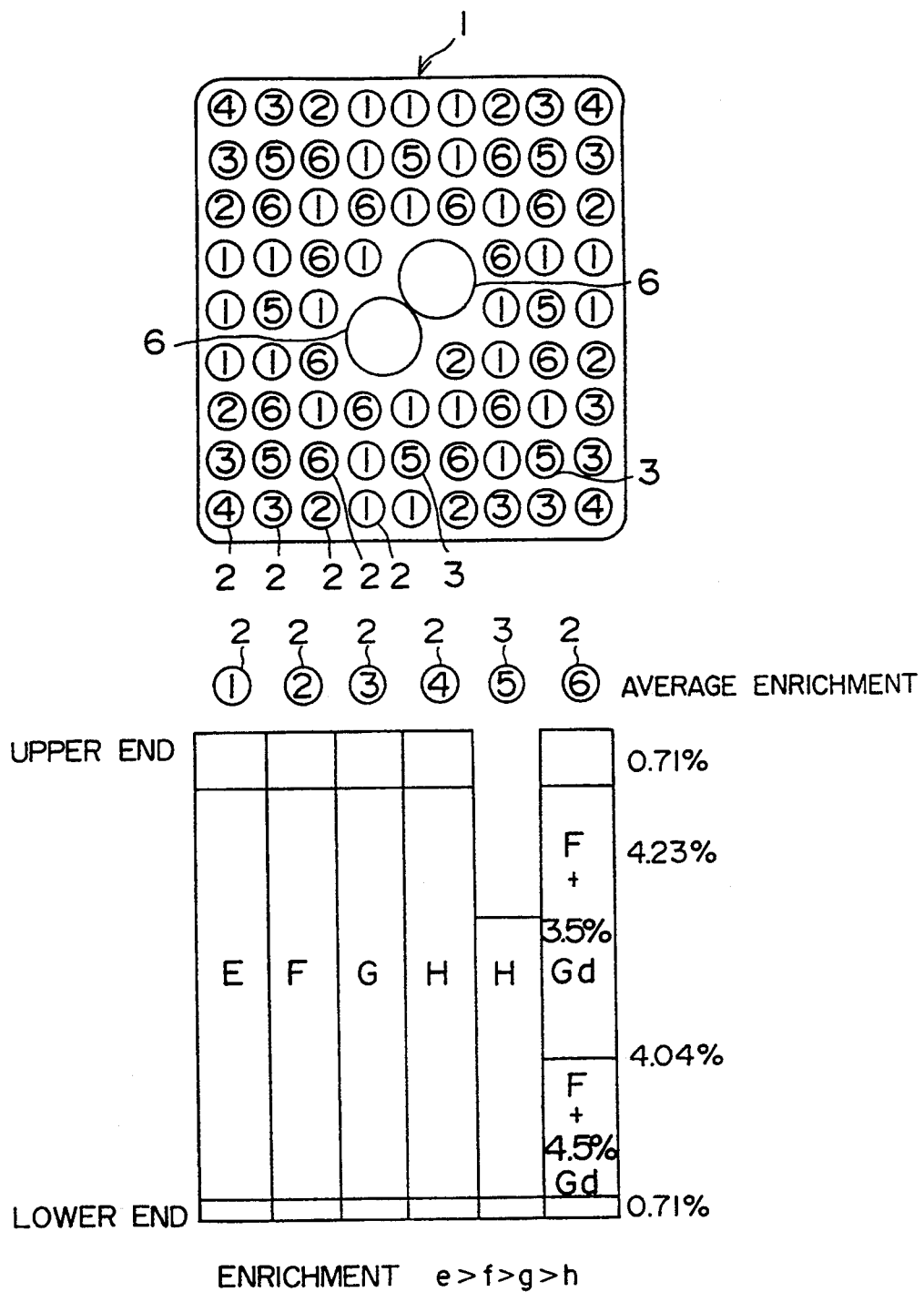
FIG. 8 are plan views showing a condition of arrangement of fuel rod and views of axial distribution of the enrichment and gadolinia content in each of the fuel rods of said 2 stream fuel assemblies in the prior art, (A) and (B) showing a type 1 fuel assembly and a type 2 fuel assembly, respectively.
Figure 8B:
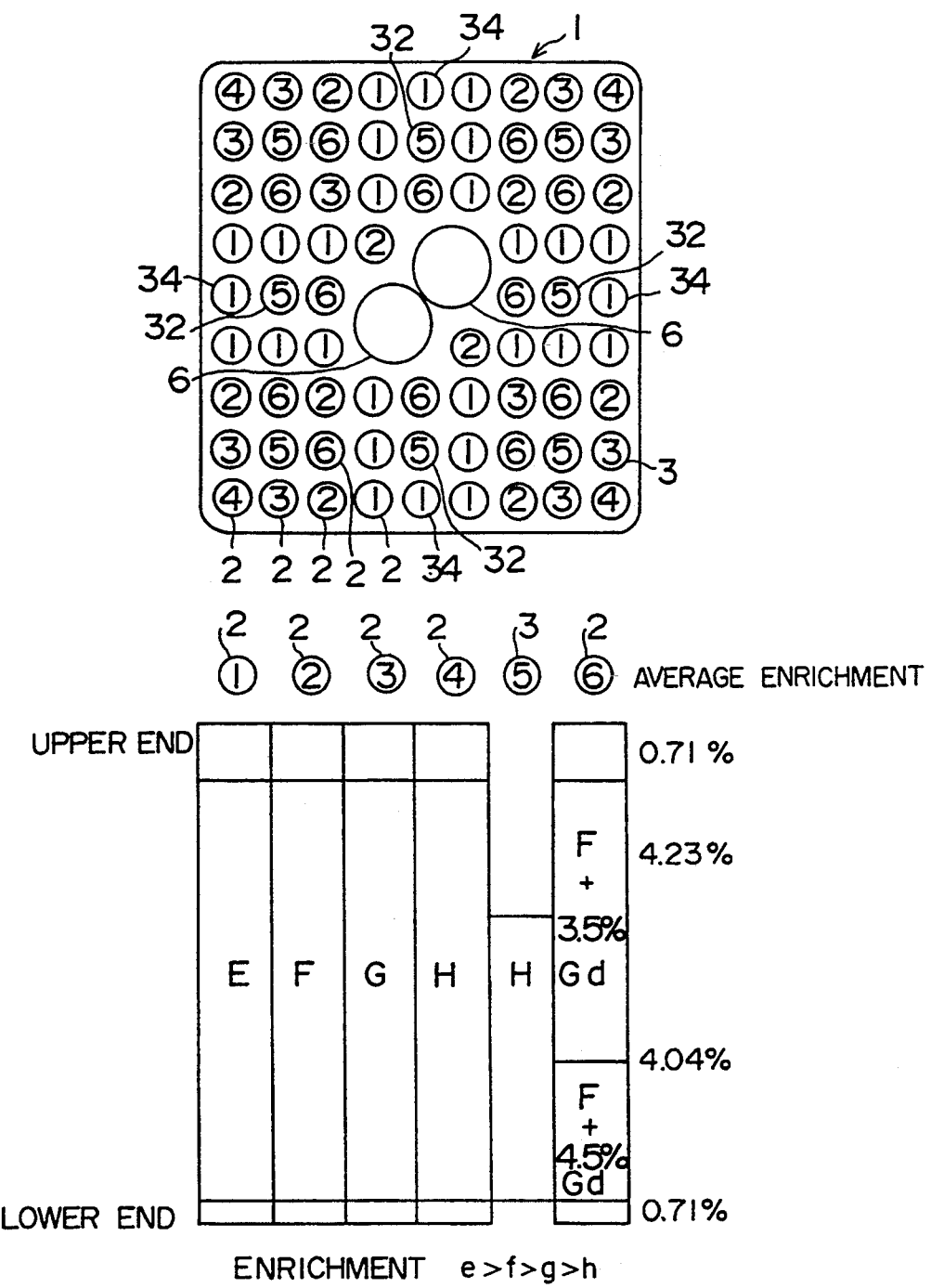

FIG. 8 shows a conventional embodiment for comparison with the embodiment in which FIG. 8 (A) shows a type 1 fuel assembly and FIG. 8 (B) shows a type 2 fuel assembly. The assemblies shown in these figures have substantially the same construction, and the order of the enrichments of the fuel pellets filled within the fuel rods are E>F>G>H, and the enrichments of the short fuel rods represented by symbol H is lowest one.

As a result, the horizontally cross sectional averaged enrichment of the assembly is so axially distributed that the enrichment of the upper portion is approximately 0.2% higher than that of the lower portion bounded at the upper end of active length of short fuel rods 3. The 15 long fuel rods represented by numeral 6 in the type 1 fuel assembly, and the 12 long fuel rods represented by numeral 6 in the type 2 assembly, each have the same gadolinia distribution respectively as described in the long fuel rods represented by the corresponding same number of the ninth embodiment of the present invention shown in FIG. 7.

Figure 9A:
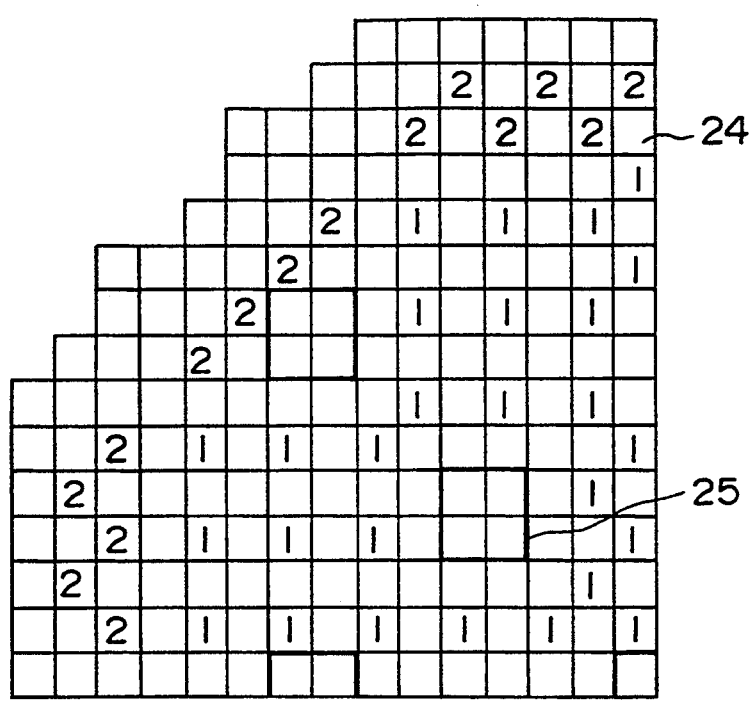
FIG. 9(A) is a plan view showing ¼ of an equilibrium core loaded only with said 2 stream fuel assemblies of a ninth embodiment of the invention or of an example of the prior art.
Figure 9B:
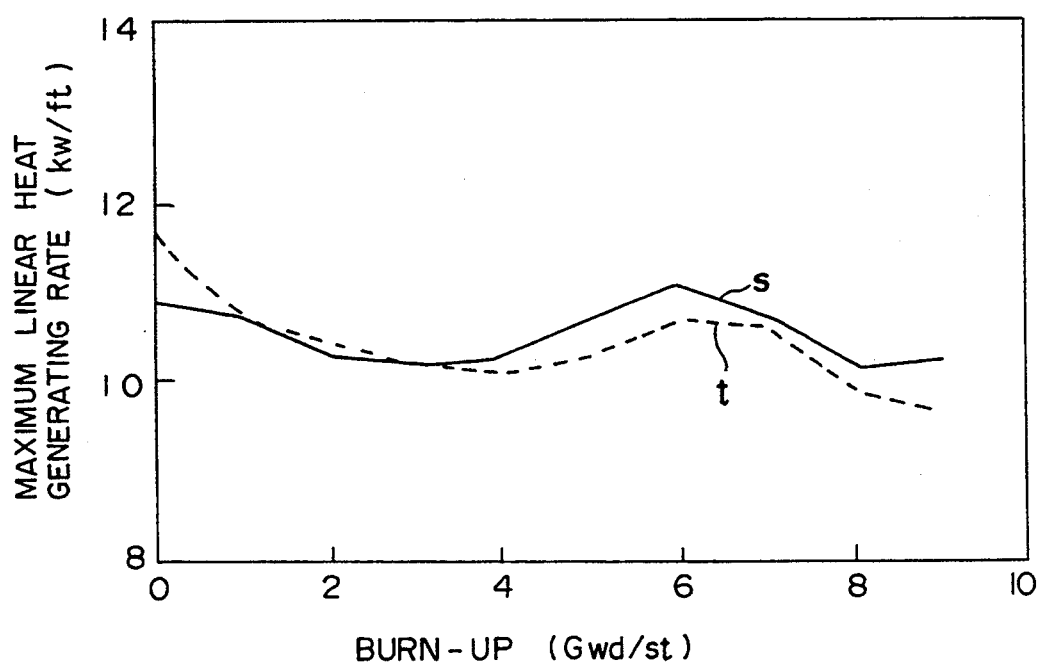
FIG. 9(B) is a characteristic view showing the maximum linear heat generating rate in (A)

The fuel arrangement of an equilibrium core which are incorporated in these type 1 and type 2 assemblies and the maximum linear heat generating rate of the core are shown in FIG. 9. FIG. 9 (A) is a quaternary plan view of the core in which one square 24 shows one fuel assembly. The position of new fuels are shown as numerals 1 and 2, the former shows the type 1 fuel assembly and the latter shows the type 2 fuel assembly.

Concerning other positions, the fifth burn cycle fuels are arranged in the peripheral region, a part of the fourth burn cycle fuels are arranged in control cell 25 shown by the large square for 4 fuel assembly with the thick line, and the other fuels (i.e., second and third burn cycle fuels) are almost uniformly arranged in the remaining portions. FIG. 9 (B) shows the maximum linear heat generating rate trends of the core in FIG. 9 (A).

The maximum linear heat generating rate (curve s in FIG. 9 (B)) in the core where the fuel assemblies according to the ninth embodiment of the present invention are loaded is markedly reduced at the beginning of cycle in comparison with the maximum linear heat generating rate (curve t in the same figure) in the core where the conventional fuel assemblies are loaded. Although the maximum linear heat generating rate of this embodiment conversely increases at a latter half of cycle, the maximum value throughout cycle is improved, indicating the effectiveness of this embodiment.

Figure 11A:
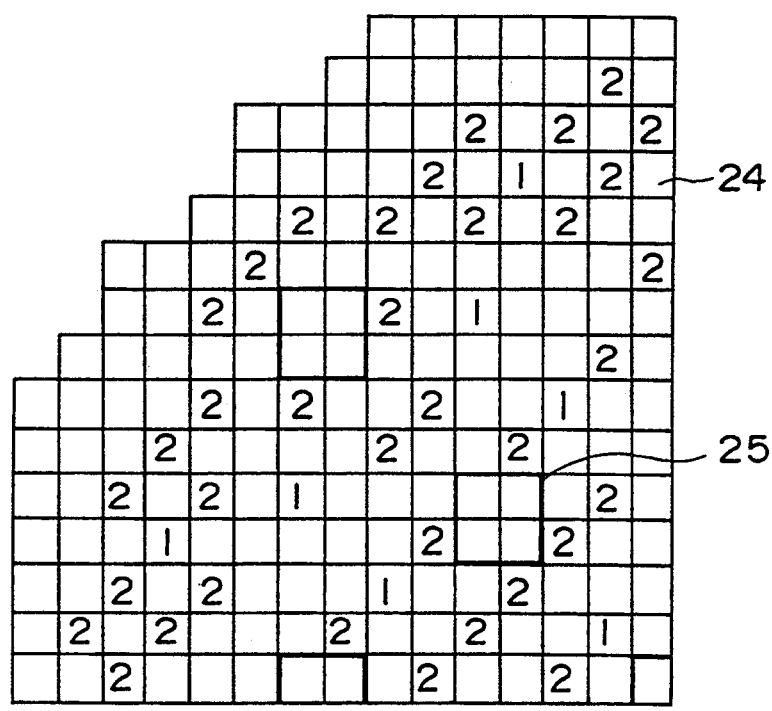
FIG. 11(A) is a plan view of new fuel arrangement of ¼ of a core in a second transition cycle from an equilibrium core loaded with a fuel assembly for low burn-up to an equilibrium core shown in FIG. 9.
Figure 11B:
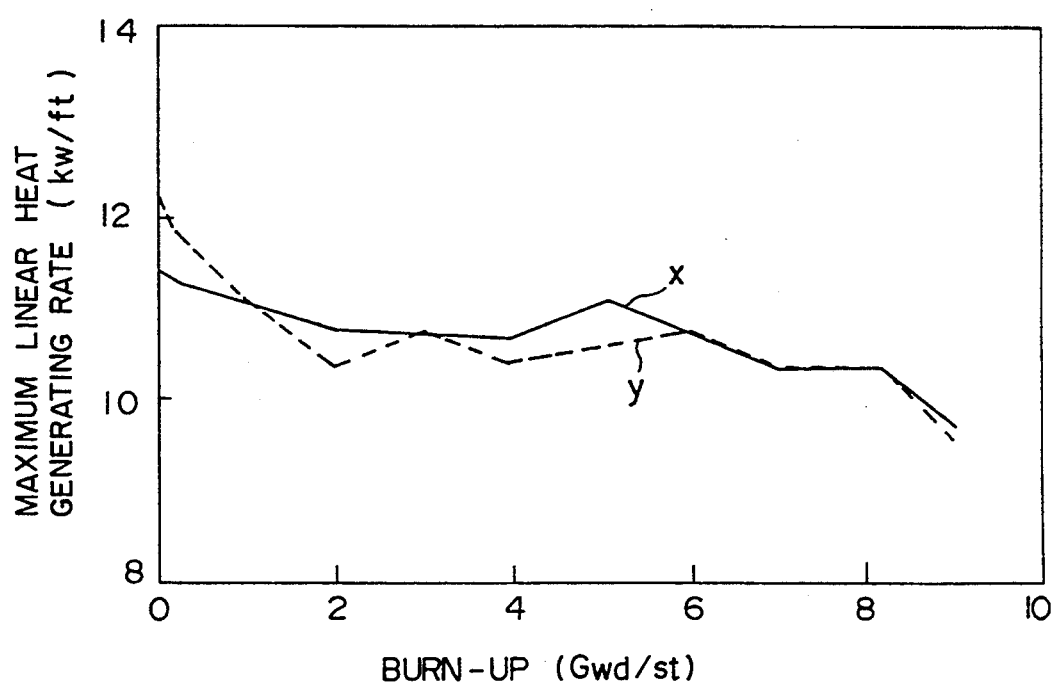
FIG. 11(B) is a characteristic view showing the maximum linear heat generating rate in (A)

Next, FIG. 10(A) shows the fuel arrangement of first transition cycle core where the high burn-up aimed fuel assemblies shown in FIG. 7 or 8 are at first loaded in an equilibrium core of the lower burn-up fuel assemblies, and FIG. 10(B) shows the maximum linear heat generating rate trend in that cycle and FIG. 11(B) shows the fuel arrangement of the second transition cycle core and FIG. 11(B) shows the maximum linear heat generating rate trend in that cycle. FIGS. 10 (A) and 11 (A) are quaternary plan views of the core in which numerals 1 and 2 represent the new fuel and show type 1 and the type 2 high burn-up aimed fuel assembly, respectively.

In the positions shown with blank square in the figure, fuel assemblies for low burn-up (for example disclosed in FIGS. 1 to 4 of Japanese Unexamined Patent Publication Hei-2-296192 (JPA 296192 (1990))) are loaded in the first transition cycle.

They are a square matrix fuel rods bundle with 8 lines and 8 rows having a large diameter water rod corresponding to 4 fuel rods cell, and an average enrichment of about 3.3%. At the second transition cycle, the new fuel and the second burn cycle fuels of high burn-up aimed fuel assemblies are loaded in addition to those of the low burn-up aimed fuel assemblies.

In FIGS. 10 (B) and 11 (B), curves u and x show the maximum linear heat generating rate, in the case where the fuel assemblies according to the second embodiment of the present invention are loaded as new fuels, while curves v and y represent the case where the conventional fuel assemblies are loaded as new fuels.

The new fuels loaded in the first transition cycle have higher enrichment than those of the low burn-up aimed fuel assemblies, but the infinite neutron multiplication factor is relatively small at the beginning of life, because of the large number of fuel rods containing gadolinia.

Consequently, at the beginning of the first transition cycle, the maximum linear heat generating rate appears in the low burn-up aimed fuel assemblies of the second burn cycle. For this reason, the maximum linear heat generating rate can become sufficiently small even in the case of using the conventional high burn-up aimed fuel assemblies, indicating that almost no improvement can be achieved even in the case of using the embodiment according to the present invention.

At the second transition cycle, the maximum linear heat generating rate appears in the high burn-up aimed fuel assemblies of the second burn cycle. In particular, since the infinite neutron multiplication factor comes to the peak at the beginning of cycle, the maximum linear heat generating rate would increase.

Furthermore, as shown in FIG. 11 (A), since the number of the new fuels in the transition cycle is greater than that in the equilibrium cycle, the type 2 fuel assemblies with fewer gadolinia containing fuel rods are arranged up to the center of the core for ensuring excess reactivity at the beginning of cycle.

Hence, by particularly lowering the infinite neutron multiplication factors of the lower portions of the type 2 fuel assemblies at the beginning of life according to the present invention, the axial power distribution at the center of the core is flattened so as to suppress the axial power peak of the second burn cycle fuels which have high radial power peaking, whereby the maximum linear heat generating rate at the beginning of cycle can be drastically reduced.

On the other hand, both in the cases of the ninth embodiment of the present invention of 2 stream fuel core as shown in FIG. 7 and the conventional embodiment of 2 stream fuel core as shown in FIG. 8, the axial enrichments distribution of central portions except for the upper and lower ends are uniform in both the long fuel rods and the short fuel rods.

In these fuel assemblies, the difference of horizontally cross sectional averaged enrichments between the upper and lower portions of the assemblies is achieved by the lower enrichment short fuel rods than the average enrichment of the long fuel rods. Thereby, the axial power distribution is flattened direction.

The other means for achieving the difference of the horizontally cross sectional averaged enrichments of assemblies between the upper and lower portions, for example, is the means that the fuel rods represented by numeral 1 in FIG. 7, have axial enrichment distribution in the central portion except for the upper and lower ends with natural uranium, in FIG. 7.

However, if the pellet enrichment charges by the way of filling the fuel pellets into the cladding tube in the production of the fuel rods, the steps of the production become complicated and, the inspection of the fuel rod after completion also requires much more steps. These may possibly lead to an increase in the production cost.

Consequently, as utilized in the ninth embodiment of the present invention or the conventional embodiment for 2 stream fuel core, if the difference of the horizontally cross sectional averaged enrichments of the assembly between the upper and lower portions is made by the lower enrichments of the short fuel rods as described above in the first to third embodiment of the present invention, the steps of the production and the steps of inspection can drastically be simplified.

However, if we use the fuel assembly shown in FIG. 8, the enrichment of the short fuel rod must be extremely lowered, in order to flatten the axial power distribution by using only the lower enrichment short fuel rods than the horizontally cross sectional averaged enrichment of the fuel assembly and uniform axial enrichment distribution in fuel rods except for the upper end and/or the lower end. As a result, in order to maintain a prescribed bundle average enrichment, the enrichments of the other fuel rods must be higher, leading to an increase in the local power peaking of the fuel assembly.

In contrast, when the axial power distribution is flattened by using the optimal combination of the axial enrichment distribution and the axial gadolinia content distribution according to this embodiment, it prevent too much lower enrichment of the short fuel rods, and reduces the local power peaking.

In the case of the ninth embodiment of the present invention, as a result of appropriately defining the enrichment, A to H, in FIGS. 7 and 8, the local power peaking decrease by 2% both in the type 1 fuel assembly and the type 2 fuel assembly, at the burn-up when the infinite neutron multiplication factor is the peak. The maximum linear heat generating rate shown in FIGS. 9 to 11 already included such effect.

In the ninth embodiments shown in FIG. 7, the fuel rods arrangement enhances the safety performance of the nuclear reactor. At the shut down status of the nuclear reactor, all of the control rods are inserted in the core and, when the reactor starts, they are gradually and sequentially withdrawn. At this time, if any control rod, which ought to be withdrawn, but remains inserted by any reason, it may be predicted that the rod suddenly drops. (We call this phenomena the control rod drop accident).

At the control rod drop accident, the increase of fuel rod temperature due to the insertion of the reactivity has been known to be largest in the new fuel. Particularly, in the case of the core of the 2 stream fuel assembly, the type 2 fuel assembly which has a larger infinite neutron multiplication factor causes a much higher fuel rod temperature tendency than the type 1 fuel assembly.

Hence, it is effective to make the local power peaking of the type 2 fuel assembly lower to mitigate the control rod drop accident. Moreover, since the neutron flux forms a peak at the position $\frac{1}{4}$ to $\frac{1}{3}$ downward from the top of the core at the reactor shut down status, it is required to lower the local power peaking in the upper region, shown in FIG. 16(B) where short fuel rods don't exist, in the high burn-up aimed fuel assembly 1.

In the case of the type 2 fuel assembly of the conventional 2 stream fuel embodiment shown in FIG. 8 (B), long fuel rods represented by numeral 1 have the highest enrichment and are arranged on the same location of peripheral of the fuel assembly so as to enhance the economy. In the hot operating status, since the void fraction over the short fuel rod 32 reaches approximately 70%, the power of fuel rods 34 is not so high at peripheral adjacent to the short rod.

However, at the shut down status, since the portion over the short fuel rod 32 is filled with high density cool water, the thermal neutron flux is high. The power of fuel rod 34 arranged on the peripheral adjacent to the short rod 32 is increased accordingly.

In order to improve this, in the case of the type 2 fuel assembly of the ninth embodiment according to the present invention shown in FIG. 7 (B), the long fuel rod 33 arranged on the peripheral adjacent to the short fuel rod 32 has the next highest enrichment.

As a result, the local peaking of the type 2 fuel rod at the shut down status can be reduced by 3% in the case of the ninth embodiment according to the present invention in comparison with the conventional embodiment. This makes it possible to reduce the fuel rod enthalpy on the control rod drop accident. Since the infinite neutron multiplication factor in the type 1 fuel assembly is smaller than that in the type 2 fuel assembly, the higher local peaking of the type 1 assembly at the shut down status doesn't induce so high fuel rod enthalpy.

In the type 1 fuel assembly of the ninth embodiment according to the present invention shown in FIG. 7 (A), the fuel rods represented by numeral 1 have the highest enrichment, and are positioned at the location 35 corresponding to fuel rods 33 of peripheral of the type 2 fuel assembly, so as to enhance the fuel economy.

In the case where a 2 stream design fuel assembly is used, it is desirable having the same number for the same enrichment between type 1 fuel and type 2 fuel as in this embodiment. When the assembly is so constructed, even when the fraction of loading the type 1 fuel assembly and the type 2 fuel assembly changes with the change of the cycle length, etc., it is possible to deal with such a matter only by adjusting the gadolinia content or the number of gadolinia containing fuel rod in the fuel production factory. Since the enrichment of uranium has been decided far prior to the production of the fuel, the enrichment cannot easily be changed.

As described above, in the case where the same number of fuel rods having the same enrichment is used to construct the two types of fuel assemblies, the only differences between the two types of fuel assemblies are the numbers of fuel rods containing gadolinia, and of the fuel rods having the same enrichment as that of the former and containing no gadolinia. Since gadolinia has a low thermal conductivity, it is usually incorporated in the fuel pellets having the second or third highest enrichment.

Since there are a large number of fuel rods containing no gadolinia and having the second or third highest enrichment in the type 2 fuel assembly, which has a smaller number of fuel rods containing gadolinia, such rods can be used as fuel rods 33 arranged on the peripheral position.

Tenth Embodiment

Figure 12A:
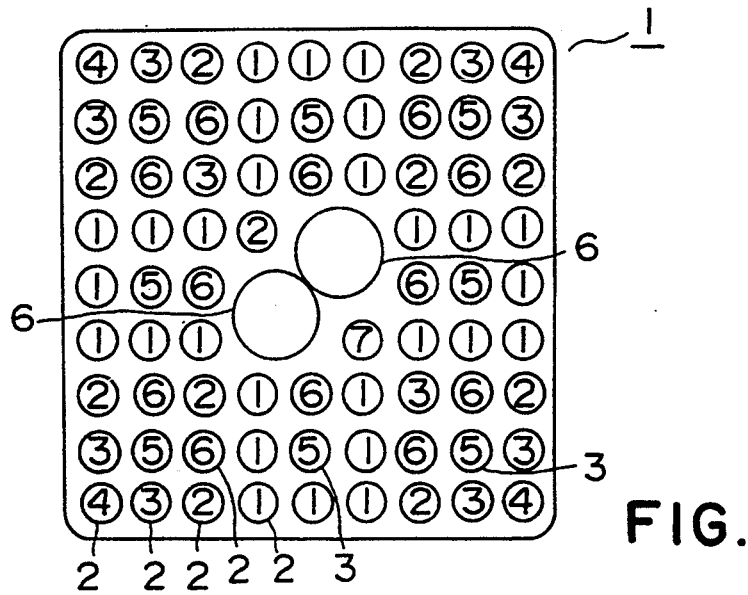
FIG. 12(A) is a plan view of arrangement of fuel rod.
Figure 12B:
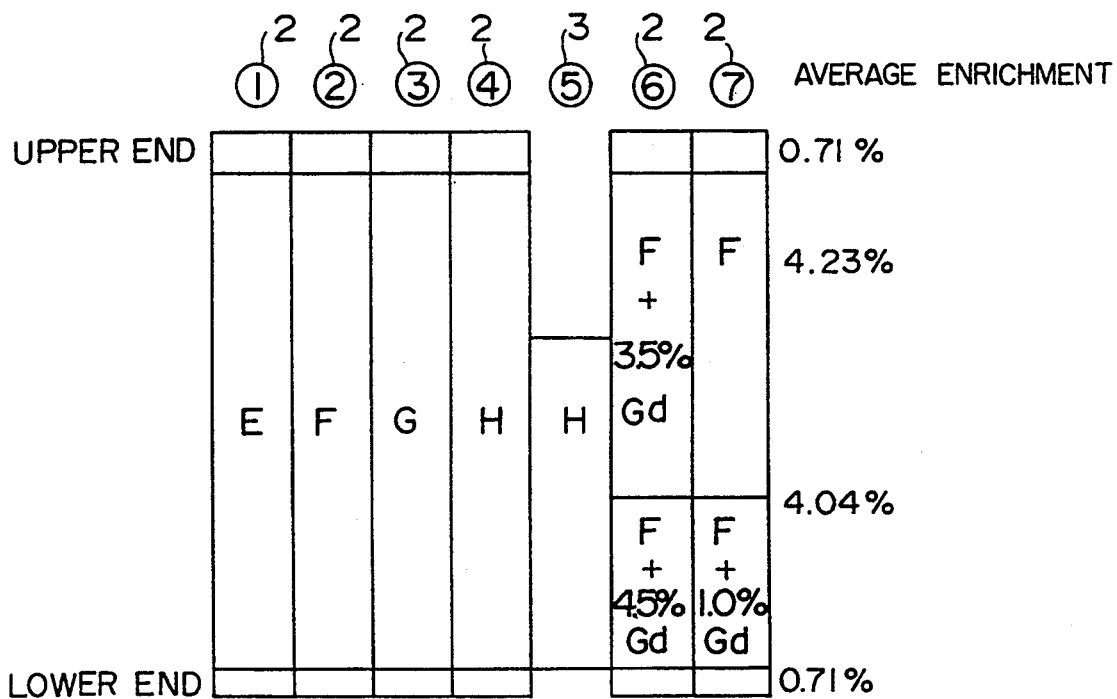
FIG. 12(B) is a view of axial distribution of the enrichment and gadolinia content in each of the fuel rods in FIG. 12(A), (A) and (B) showing a type 2 fuel assembly used for a 2-stream core in a tenth embodiment of the invention.

The type 2 fuel assembly which is used in the core of a 2 type burnable poison design (said 2 stream design) fuel assembly, which is the tenth embodiment of the present invention, is described by referring to FIG. 12. The type 1 fuel assembly used in this embodiment is the same as that shown in FIG. 8 (A).

That is, in the tenth embodiment, the second group of burnable poison-containing fuel rods in which gadolinia is only contained in the lower portion is only used in the type 2 fuel assembly which has a smaller number of fuel rods containing gadolinia. As a result, the maximum linear heat generating rate at the beginning of the run cycle is reduced in comparison with that of the conventional embodiment shown in FIG. 8.

Subsequently, the eleventh to thirteenth embodiments of the present invention describe various application arts, of which are the core of a 1 type burnable poison design fuel assembly. It is obvious that these embodiments can be similarly applied to 2 stream fuel assemblies.

Eleventh Embodiment

Figure 13A:
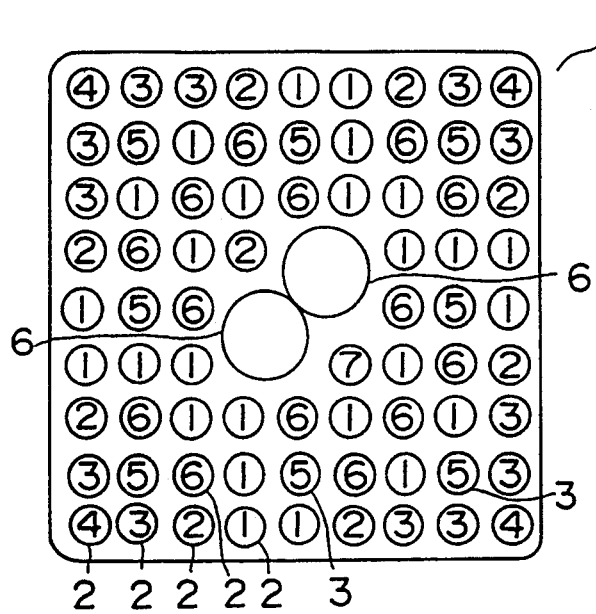
FIG. 13(A) is a plan view of fuel rod arrangement.
Figure 13B:
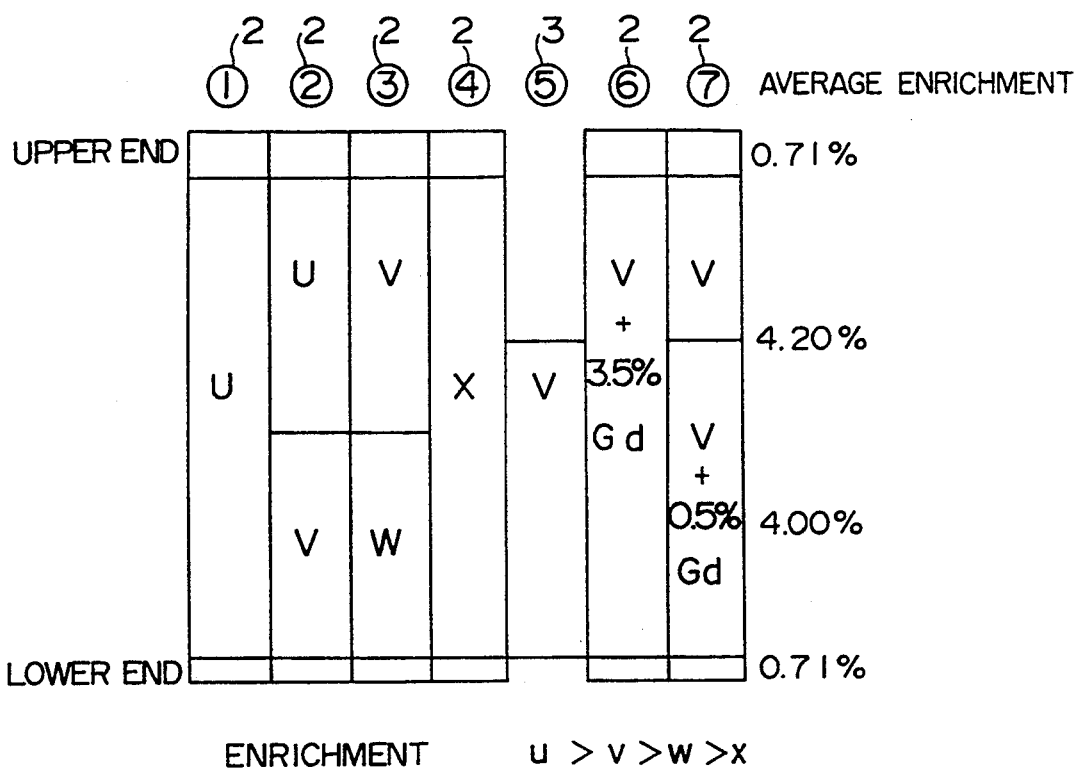
FIG. 13(B) is a view of axial distribution of the enrichment and gadolinia content in each of the fuel rods in FIG. 13(A), (A) and (B) showing a fuel assembly in an eleventh embodiment of the invention.

A fuel assembly which is the eleventh embodiment of the present invention is described by referring to FIG. 13, wherein the long fuel rods represented by numerals 6 and 7 are the first group and the second group of fuel rods containing gadolinia, respectively.

In this embodiment, the order of the fuel pellet enrichments in the fuel rods is, from high to low, U>V>W>X, the fuel rods represented by numerals 2 and 3 have axial enrichment distribution.

As a result, the upper portion of the assembly has a horizontally cross sectional averaged enrichment approximately 0.2% higher than that of the lower portion. Hence, although the production and the inspection of fuels are somewhat complicated, the local power peaking can be reduced, since there is no need for excessively lowering the enrichment of the short fuel rods.

Twelfth Embodiment

Figure 14A:
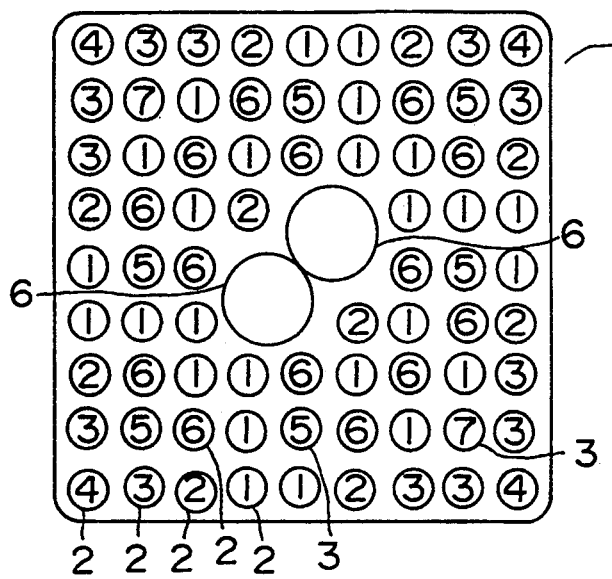
FIG. 14(A) is a plan view of fuel rod arrangement.
Figure 14B:
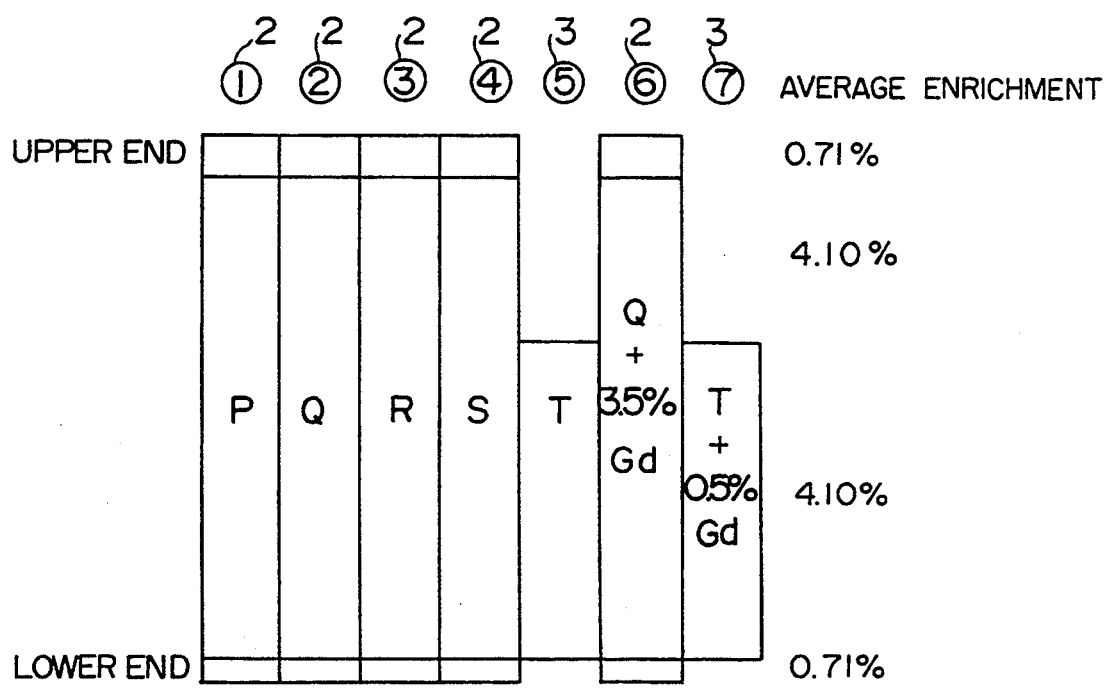
FIG. 14(B) is a view of axial distribution of the enrichment and gadolinia content in each of the fuel rods in FIG. 14(B), (A) and (B) showing a fuel assembly in a twelfth embodiment of the invention.

A fuel assembly which is the twelfth embodiment of the present invention is described by referring to FIG. 14. Whereas in the eighth embodiment shown in FIG. 5, the long fuel rods are used as the second group of burnable poison-containing fuel rods, in this embodiment, gadolinia is incorporated in the entire regions of the active portions of 2 short fuel rods in a concentration of 0.5% to be used as the second group of burnable poison-containing fuel rods.

In this embodiment, with the exception of the upper and lower end natural uranium oxide filled portions, the compositions of fuel pellets are axially uniform in all of the fuel rods and, thus, the production and the inspection of the fuel rods are drastically simplified.

Thirteenth Embodiment

Figure 15A:
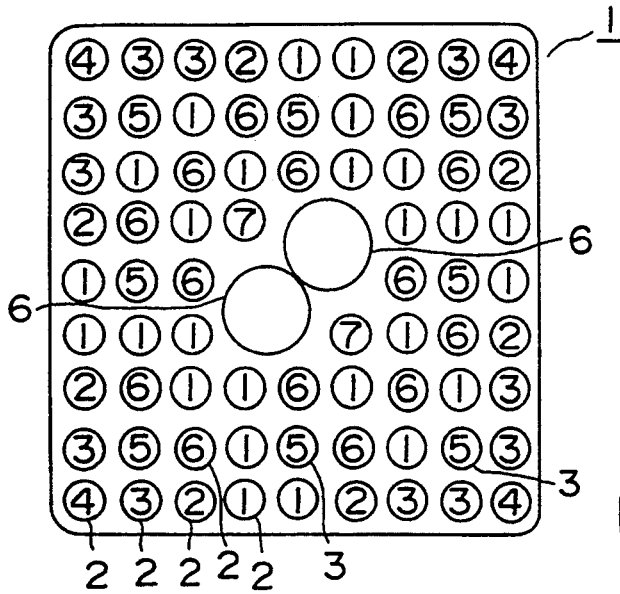
FIG. 15(A) is a plan view of fuel rod arrangement.
Figure 15B:
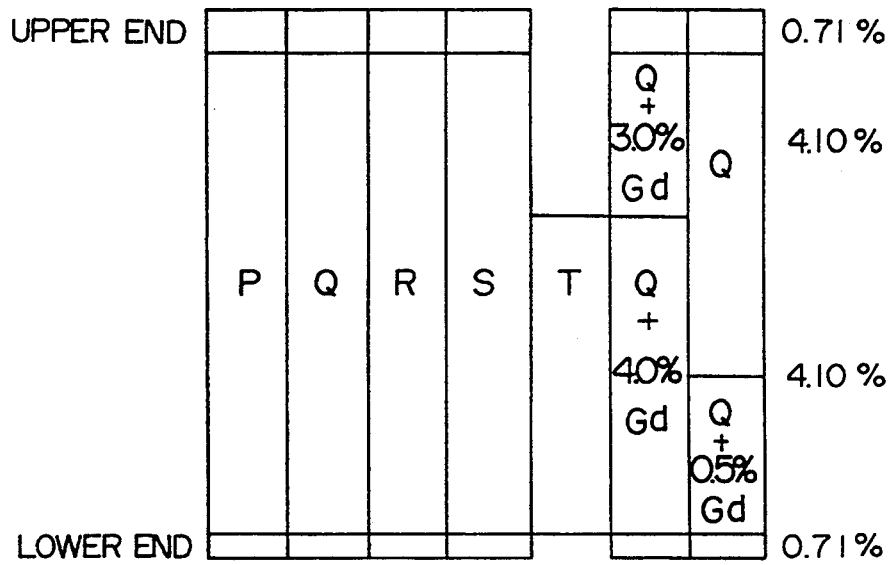
FIG. 15(B) is a view of axial distribution of the enrichment and gadolinia content in each of the fuel rods in FIG. 15(A), (A) and (B) showing a fuel assembly in a thirteenth embodiment of the invention.

A fuel assembly which is the thirteenth embodiment of the present invention is described by referring to FIG. 15. In this embodiment, in comparison with the eighth embodiment shown in FIG. 5, the gadolinia concentration of the portions above the upper end of the short fuel rod 3 is lower than that of the lower portion in the first group of the burnable poison-containing fuel rods represented by numeral 6. This reduces the gadolinia which remains un-burned at the end of cycle, thereby enhancing the economy.

In the high burn-up aimed fuel assembly 1 with the short fuel rod 3 shown in FIG. 16, high density cold water works as the neutron absorber at the upper portion where there is much more coolant at the shut down status of the nuclear reactor. So the shut down margin is excessively reduced, the enrichment at the upper portion may be approximately 0.1 to 0.3% lower than that at the lower portion.

In the thirteenth embodiment, the gadolinia concentration at the lower portion of the first group of the burnable poison-containing fuel rods represented by numeral 6 is set high. The boundary position in axial gadolinia content distribution is different from the upper end of the gadolinia containing region of the second group of the burnable poison-containing fuel rods represented by numeral 7.

As described above, the boundary positions of the axial gadolinia concentration distribution in the first and the second group fuel rods with gadolinia, and also the boundary positions of the axial enrichment distribution in the case where the enrichment is distributed in the axial direction can be considered as various combinations. Furthermore, although the explanation described above is made taking into the consideration the use of uranium-235 as a fissile substance, fissile Pu, or mixture of uranium-235 and fissile PU can similarly be applied.

According to the present invention, in a high burn-up aimed fuel assembly composed of long fuel rods and short fuel rods, the axial power distribution can be optimally flattened by incorporating a low concentration of gadolinia in at least part of the lower portion in the axial direction where short fuel rods exist.

That is, since the power distribution at the beginning of cycle is flattened, the maximum linear heat generating rate can be reduced. Moreover, at the middle stage of the cycle, the axial power distribution can become a downward peak, and a spectral shift effect can be enhanced to improve the fuel economy.

Moreover, in a 2 stream fuel assembly, the type 1 fuel assembly has more gadolinia containing fuel rods than type 2 fuel assembly, but type 2 fuel assembly has more number of partially gadolinia containing fuel rods than type 1 fuel assembly, in at least part of a lower portion in the axial direction where the short fuel rods exist. So the maximum linear heat generating rate can be sufficiently low not only in an equilibrium cycle core which is operated according to a schedule, but also in the case where the cycle length changes from previously determined one.

Also, in the case of a transition cycle from an equilibrium core composed of low burn-up aimed fuel assemblies to an equilibrium core composed of high burn-up fuel assemblies, the maximum linear heat generating rate can be sufficiently low.

In addition, the long fuel rods which are adjacent to the short fuel rods and arranged on the peripheral of the assembly in the type 2 fuel assembly, have lower enrichment than those in the type 1 fuel assembly. So the type 2 fuel assembly has lower local power peaking at the low coolant water temperature condition, although type 2 fuel assembly has a higher infinite neutron multiplication factor at the beginning of cycle than that of the type 1 fuel assembly. And it works for reducing the fuel rod enthalpy increment on the control rod drop accident.

As described above, the application of the present invention can provide a high burn-up aimed fuel assembly having high safety at the time of operating and shut down status and excellence in economy.

What is claimed is:

1. A fuel assembly for a boiling water reactor, which comprises
   an upper tie plate;
   a lower tie plate;
   a plurality of fuel rods which are filled therein with a plurality of fuel pellets, said plurality of fuel rods comprising long fuel rods and short fuel rods which are each shorter in the active portion than each of said long fuel rods, the length of said short fuel rods being longer than half of the length of said long fuel rods, said short fuel rods dispersed between said long fuel rods;
   a plurality of spacers for retaining said fuel rods in a spaced relation from each other;
   a fuel bundle comprising said plurality of fuel rods with said plurality of spacers and disposed between said upper and lower tie plates;
   the concentration of fissile material in each of said short fuel rods being lower than the mean concentration of fissile material in the cross section of said fuel bundle, and in the case where said fuel bundle is vertically subdivided into two regions, an upper and lower one, at the upper end of the active portion of each of said short fuel rods, the mean concentration of fissile material in the cross section of said fuel bundle in a lower region being lower than that in the cross section of said fuel bundle in an upper region; and
   a polygonal tube-like channel box which encloses said fuel bundle and constitutes flow paths for coolant.

2. A fuel assembly for a boiling water reactor as claimed in claim 1, wherein said concentration of fissile material in said long and short fuel rods is uniform in the axial direction in the axial middle thereof except for the blanket regions at the upper or lower end or at the upper and lower ends of each of the fuel rods.

3. A fuel assembly for a boiling water reactor as claimed in claim 1, wherein said concentration of fissile material in the axial middle except for said blanket regions at the lower or upper end or at the upper and lower ends of each of said short fuel rods is lower than that of fissile material in the axial middle except for said blanket regions at the upper or lower end or at the upper and lower ends of any of said long fuel rods.

4. A fuel assembly for a boiling water reactor as claimed in claim 1, wherein the volume of gas plenums in each of said short fuel rods is smaller than the value obtained by multiplying the volume of gas plenums in each of said long fuel rods by the ratio of the volume of filled fuel pellets in each of said short fuel rods to that in each of said long fuel rods.

5. A fuel assembly for a boiling water reactor as claimed in claim 1, wherein said fuel rods comprise, as fuel rods containing burnable poison,
   a first group of fuel rods containing burnable poison which comprise a plurality of long fuel rods among said long fuel rods and which each contains burnable poison in the greater part of the axial middle region except for said blanket regions at the lower or upper end or at the upper and lower ends thereof, and
   a second group of said long or short fuel rods containing burnable poison, which contain burnable poison only in at least one portion of the part corresponding to the axial lower region where said short fuel rods exist.

6. A fuel assembly for a boiling water reactor, which comprises
   an upper tie plate;
   a lower tie plate;
   a plurality of fuel rods which are filled therein with a plurality of fuel pellets, said plurality of fuel rods comprising long fuel rods and short fuel rods which are each shorter in the active portion than each of said long fuel rods;
   a plurality of spacers for retaining said fuel rods in a spaced relation from each other;
   a fuel bundle comprising said plurality of fuel rods with said plurality of spacers and disposed between said upper and lower tie plates;
   said fuel rods further including fuel rods containing burnable poison, which comprise
      a first group of fuel rods containing burnable poison which comprise a plurality of long fuel rods among said long fuel rods and which each contain burnable poison in a greater part of an axial middle region except for blanket regions at the lower or upper end or at the upper and lower ends thereof, and
      a second group of said long or short fuel rods containing burnable poison, which contains burnable poison in at least one portion of the part corresponding to the axial lower region where said short fuel rods exist, wherein said concentration of burnable poison in said second group of long or short fuel rods containing burnable poison is lower than that in said first group of long fuel rods containing burnable poison; and a polygonal tube-like channel box which encloses said fuel bundle and constitutes flow paths for coolant.

7. A fuel assembly for a boiling water reactor, which comprises an upper tie plate;

a lower tie plate;

a plurality of fuel rods which are filled therein with a plurality of fuel pellets, said plurality of fuel rods comprising long fuel rods and short fuel rods which are each shorter in the active portion than each of said long fuel rods;

a plurality of spacers for retaining said fuel rods in spaced relation from each other;

a fuel bundle comprising said plurality of fuel rods with said plurality of spacers and disposed between said upper and lower tie plates;

the concentration of fissile material in at least one portion of said long fuel rods positioned in the vicinity of the middle in the side direction of the outermost periphery of said fuel bundle and adjacent to said short fuel rods (hereinafter referred to as A group of long fuel rods) being lower in at least the axial upper part thereof than that in the fuel rods on the outermost periphery adjacent to said A group of long fuel rods; and a polygonal tube-like channel box which encloses said fuel bundle and constitutes flow paths for coolant.

8. A fuel assembly for a boiling water reactor as claimed in claim 1, wherein said concentration of fissile material in at least one portion of said long fuel rods positioned in the vicinity of the middle in the side direction of the outermost periphery of said fuel bundle and adjacent to said short fuel rods (hereinafter referred to as A group of long fuel rods) being lower in at least the axial upper part thereof than that in the fuel rods on the outermost periphery adjacent to said A group of long fuel rods; and a polygonal tube-like channel box which encloses said fuel bundle and constitutes flow paths for coolant.

9. A core for a boiling water reactor loaded with said fuel assemblies as described in claim 6, wherein said fuel assemblies comprise a type 1 fuel assembly including said first group of more long fuel rods containing burnable poison; and a type 1 fuel assembly including said first group of more long fuel rods containing burnable poison; and a type 2 fuel assembly including said first group of fewer long fuel rods containing burnable poison than said type 1 fuel assembly; and said type 1 fuel assembly has no said second group of long or short fuel rods containing burnable poison, or has fewer fuel rods than said type 2 fuel assembly.

10. A core for a boiling water reactor, having fuel assemblies each including, a type 1 fuel assembly having one group of more long fuel rods containing burnable poison which consist of a plurality of long fuel rods among the long fuel rods and which each contains burnable poison in a greater part of the axial middle region except for the blanket regions at the lower or upper end or at the upper and lower ends thereof, and a type 2 fuel assembly which having said one group of fewer long fuel rods containing burnable poison than said type 1 fuel assembly, the concentration of fissile material of said type 2 fuel assembly in at least the axial upper portion of at least a part of said long fuel rods adjacent to said short fuel rods and positioned on the outermost periphery of the fuel bundle being lower than the concentration of fissile material in the same axial part of the long fuel rods in the same position as said type 1 fuel assembly.

11. A core for a boiling water reactor, having fuel assemblies each including, a type 1 fuel assembly having one group of more long fuel rods containing burnable poison which consists of a plurality of long fuel rods among the long fuel rods, and which each contains burnable poison in a greater part of the axial middle region except for the blanket regions at the lower or upper end or at the upper and lower ends thereof, and a type 2 fuel assembly having said one group of fewer long fuel rods containing burnable poison than said type 1 fuel assembly, the concentration of fissile material of said type 2 fuel assembly in at least a part of said long fuel rods adjacent to said short fuel rods and positioned in the vicinity of the middle in the side direction of the outermost periphery of said fuel bundle (hereinafter referred to as A group of long fuel rods) being lower in at least the axial upper portion than the concentration of fissile material in the fuel rods on the outermost periphery adjacent to said A group of long fuel rods.

12. A fuel assembly for a boiling water reactor as claimed in claim 2, wherein said concentration of fissile material in the axial middle except for said blanket regions at the lower or upper end or at the upper and lower ends of each of said fuel rods is lower than that of fissile material in the axial middle except for said blanket regions at the upper or lower end or at the upper and lower ends of any of said long fuel rods.

13. A fuel assembly for a boiling water reactor as claimed in claim 2, wherein the volume of gas plenums in each of said short fuel rods is smaller than the value obtained by multiplying the volume of gas plenums in each of said long fuel rods by the ratio of the volume of filled fuel pellets in each of said short fuel rods to that in each of said long fuel rods.

14. A fuel assembly for a boiling water reactor as claimed in claim 3, wherein the volume of gas plenums in each of said short fuel rods is smaller than the value obtained by multiplying the volume of gas plenums in each of said long fuel rods by the ratio of the volume of filled fuel pellets in each of said short fuel rods to that in each of said long fuel rods.

15. A fuel assembly for a boiling water reactor as claimed in claim 2, wherein said fuel rods comprise, as fuel rods containing burnable poison, a first group of fuel rods containing burnable poison which comprise a plurality of long fuel rods among said long fuel rods and which each contains burnable poison in the greater part of the axial middle region except for said blanket regions at the lower or upper end or at the upper and lower ends thereof, and a second group of said long or short fuel rods containing burnable poison, which contain burnable poison only in at least one portion of the part corresponding to the axial lower region where said short fuel rods exist.

16. A fuel assembly for a boiling water reactor as claimed in claim 3, wherein said fuel rods comprise, as fuel rods containing burnable poison,
- a first group of fuel rods containing burnable poison which comprise a plurality of long fuel rods among said long fuel rods and which each contains burnable poison in the greater part of the axial middle region except for said blanket regions at the lower or upper end or at the upper and lower ends thereof, and
- a second group of said long or short fuel rods containing burnable poison, which contain burnable poison only in at least one portion of the part corresponding to the axial lower region where said short fuel rods exist.

17. A fuel assembly for a boiling water reactor as claimed in claim 4, wherein said fuel rods comprise, as fuel rods containing burnable poison,
- a first group of fuel rods containing burnable poison which comprise a plurality of long fuel rods among said long fuel rods and which each contains burnable poison in the greater part of the axial middle region except for said blanket regions at the lower or upper end or at the upper and lower ends thereof, and
- a second group of said long or short fuel rods containing burnable poison, which contain burnable poison only in at least one portion of the part corresponding to the axial lower region where said short fuel rods exist.

* * * * *